(12) United States Patent
Thompson

(10) Patent No.: US 12,128,291 B2
(45) Date of Patent: Oct. 29, 2024

(54) SUPPORT AND SUSPENSION ASSEMBLY FOR A SNOW SPORTS BOARD

(71) Applicant: SNOYAK LLC, Kingfield, ME (US)

(72) Inventor: Robert W. Thompson, Kingfield, ME (US)

(73) Assignee: SNOYAK LLC, Kingfield, ME (US)

( * ) Notice: Subject to any disclaimer, the term of this patent is extended or adjusted under 35 U.S.C. 154(b) by 0 days.

(21) Appl. No.: 18/508,658

(22) Filed: Nov. 14, 2023

(65) Prior Publication Data

US 2024/0082686 A1 Mar. 14, 2024

Related U.S. Application Data

(63) Continuation of application No. 18/060,769, filed on Dec. 1, 2022, now Pat. No. 11,844,997, which is a continuation of application No. 17/112,222, filed on Dec. 4, 2020, now Pat. No. 11,541,298, which is a continuation of application No. 16/385,671, filed on Apr. 16, 2019, now Pat. No. 10,874,933, which is a continuation of application No. PCT/US2017/056491, filed on Oct. 13, 2017.

(60) Provisional application No. 62/767,739, filed on Nov. 15, 2018, provisional application No. 62/538,890, (Continued)

(51) Int. Cl.
*A63C 11/00* (2006.01)
*B62B 13/04* (2006.01)
*B62B 17/06* (2006.01)

(52) U.S. Cl.
CPC .......... *A63C 11/001* (2013.01); *B62B 13/043* (2013.01); *A63C 2201/10* (2013.01); *A63C 2203/20* (2013.01); *B62B 17/067* (2013.01)

(58) Field of Classification Search
CPC ....... A63C 11/001; A63C 10/26; A63C 10/28; A63C 9/002; A63C 2201/10; A63C 2203/20; A63C 5/03; B62B 13/043; B62B 17/067; B62B 17/062; B62B 17/063; B62B 2206/06
See application file for complete search history.

(56) References Cited

U.S. PATENT DOCUMENTS 2,448,427 A * 8/1948 Gordon .................. A47C 16/04
   182/230
3,917,301 A * 11/1975 Fabris .................. B62B 13/043
   280/28.14
(Continued)

FOREIGN PATENT DOCUMENTS

CA  2200134 A1 * 9/2014
DE  1605867 A1 * 6/1971
(Continued)

*Primary Examiner* — Steve Clemmons
(74) *Attorney, Agent, or Firm* — Finch & Maloney PLLC

(57) ABSTRACT

Disclosed is a support and suspension assembly for a snow sports board. The assembly includes a base configured to be attached to a snow sports board and a frame above the base. The frame includes a first portion extending vertically upward or upward and forward to an upper end. The frame further includes a second portion extending generally rearward from the upper end of the first portion. A seat is on the second portion of the frame. A shock absorber is connected between the base and the frame. A linkage assembly is pivotably connected between the base and the first portion of the frame.

12 Claims, 25 Drawing Sheets

Related U.S. Application Data filed on Jul. 31, 2017, provisional application No. 62/409,691, filed on Oct. 18, 2016.

(56) References Cited

U.S. PATENT DOCUMENTS

| | | | | |
|---|---|---|---|---|
| 4,193,609 A * | 3/1980 | Bissett | ................... | B62B 13/04 |
| | | | | 280/28.14 |
| 4,589,699 A * | 5/1986 | Dungan | ................ | A47C 9/005 |
| | | | | 297/423.12 |
| 4,603,870 A * | 8/1986 | Monreal | ................ | B62B 15/00 |
| | | | | 280/18 |
| 4,629,434 A * | 12/1986 | Monreal | ................ | B63B 32/20 |
| | | | | 441/72 |
| 4,669,992 A * | 6/1987 | Morris | ................... | B63B 32/20 |
| | | | | 297/423.11 |
| 4,843,999 A * | 7/1989 | Kobus | ................... | B63B 29/04 |
| | | | | 297/423.12 |
| 4,865,572 A * | 9/1989 | Andes | ................... | B63B 32/30 |
| | | | | 280/14.1 |
| 4,930,796 A * | 6/1990 | Harrod | ................ | B62B 17/067 |
| | | | | 280/87.021 |
| 5,427,391 A * | 6/1995 | Cooper | ................. | A63C 17/02 |
| | | | | 280/809 |
| 6,019,380 A * | 2/2000 | Goodman | ............... | B62B 13/04 |
| | | | | 280/22.1 |
| 6,036,202 A * | 3/2000 | LaCome | ................ | B62B 13/04 |
| | | | | 280/28.14 |
| 6,098,567 A * | 8/2000 | Ullman | ................ | B60N 2/544 |
| | | | | 297/195.1 |
| 6,179,305 B1 * | 1/2001 | Capozzi | ................ | B62B 17/06 |
| | | | | 280/14.1 |
| 6,179,676 B1 * | 1/2001 | Wilborn | ................ | B63B 39/005 |
| | | | | 441/72 |
| 6,431,562 B1 * | 8/2002 | Vontobel | ............... | B62B 13/043 |
| | | | | 280/28.14 |
| 6,575,479 B2 * | 6/2003 | Combs | .................. | B62B 5/0023 |
| | | | | 280/22.1 |
| 7,878,513 B2 * | 2/2011 | Damouzehtash | ........ | B25H 5/00 |
| | | | | 280/32.6 |
| 8,109,523 B2 * | 2/2012 | Kolesar | .................... | B62B 13/04 |
| | | | | 280/14.28 |
| 8,128,102 B1 * | 3/2012 | Brown | ...................... | A63C 5/03 |
| | | | | 280/18 |
| 8,308,172 B2 * | 11/2012 | Gulbranson | .......... | B62B 13/043 |
| | | | | 280/14.1 |
| 8,322,731 B1 * | 12/2012 | Brown | ..................... | A63C 5/03 |
| | | | | 280/18 |
| 9,051,029 B2 * | 6/2015 | Hays, III | ................ | B63B 29/04 |
| 9,403,551 B2 * | 8/2016 | Van Der Werf | ....... | B62B 17/061 |
| 9,637,156 B2 * | 5/2017 | Rapp | ..................... | B62B 17/063 |
| 10,494,066 B1 * | 12/2019 | Garcia | ..................... | B63B 32/40 |
| 10,549,175 B2 * | 2/2020 | Arcouette | ............. | B62B 13/043 |
| 2006/0027982 A1 * | 2/2006 | Smith | ................... | B62B 13/043 |
| | | | | 280/27 |
| 2016/0144882 A1 * | 5/2016 | Holub | ................... | B62B 17/063 |
| | | | | 280/845 |

FOREIGN PATENT DOCUMENTS

| | | | | |
|---|---|---|---|---|
| DE | 10311216 A1 * | 3/2004 | ............ | A63C 17/28 |
| EP | 2022544 B1 * | 10/2014 | ............... | A63C 5/00 |
| EP | 3653277 A1 * | 5/2020 | ........... | A63C 11/001 |
| FR | 2611515 A * | 9/1988 | ............... | A63C 5/03 |
| FR | 2770142 A1 * | 4/1999 | ............... | A63C 5/16 |
| GB | 2340739 A * | 3/2000 | ......... | A63B 71/0009 |
| KR | 1646611 B1 * | 8/2016 | ............... | A47C 7/02 |
| WO | WO-9843862 A1 * | 10/1998 | ........... | B62B 13/043 |
| WO | WO-9847577 A1 * | 10/1998 | ............. | A63C 11/00 |
| WO | WO-02087709 A1 * | 11/2002 | ........... | A63C 11/001 |

* cited by examiner

SUPPORT AND SUSPENSION ASSEMBLY FOR A SNOW SPORTS BOARD

RELATED APPLICATIONS

This application is a continuation of U.S. patent application Ser. No. 18/060,769 titled SUPPORT AND SUSPENSION ASSEMBLY FOR A SNOW SPORTS BOARD and filed on Dec. 1, 2022, which is a continuation of U.S. patent application Ser. No. 17/112,222 titled SUPPORT AND SUSPENSION ASSEMBLY FOR A SNOW SPORTS BOARD and filed on Dec. 4, 2020, which is a continuation of U.S. patent application Ser. No. 16/385,671 (now U.S. Pat. No. 10,874,933) titled SUPPORT AND SUSPENSION ASSEMBLY FOR A SNOW SPORTS BOARD and filed on Apr. 16, 2019, which claims the benefit of U.S. Provisional Patent Application No. 62/767,739 titled SUSPENSION ASSEMBLY FOR A SNOW SPORTS BOARD and filed on Nov. 15, 2018, and which is a continuation-in-part application of PCT application no. PCT/US2017/056491 filed on Oct. 13, 2017, said PCT application which designates the United States and claims the benefit of U.S. Provisional Patent Application No. 62/538,890 titled BINDING AND SUPPORT APPARATUS FOR A SNOW SPORTS BOARD and filed on Jul. 31, 2017, and which claims the benefit of U.S. Provisional Patent Application No. 62/409,691 titled BINDING ASSEMBLY FOR A SNOWBOARD and filed on Oct. 18, 2016. The contents of the aforementioned applications are incorporated herein by reference in their entireties.

TECHNICAL FIELD

The present disclosure relates generally to equipment for snow sports. Specifically, the present disclosure relates to support and suspension assemblies for riders of a snow sports board.

BACKGROUND

Skiing, snowboarding, and sledding are snow sports enjoyed for recreation and competition in many countries around the world. Skiing and snowboarding involve descending snowy terrain in a standing position with the rider's feet attached to the skis or snowboard. Sledding, by contrast, involves the rider descending a snowy hill while sitting, kneeling, or lying on a sled with no particular attachment to the sled other than the rider's grip. In yet another winter activity, some use a kayak to descend a hill covered with loose snow while using a paddle to make turns, much like is done in whitewater.

Figure 1:
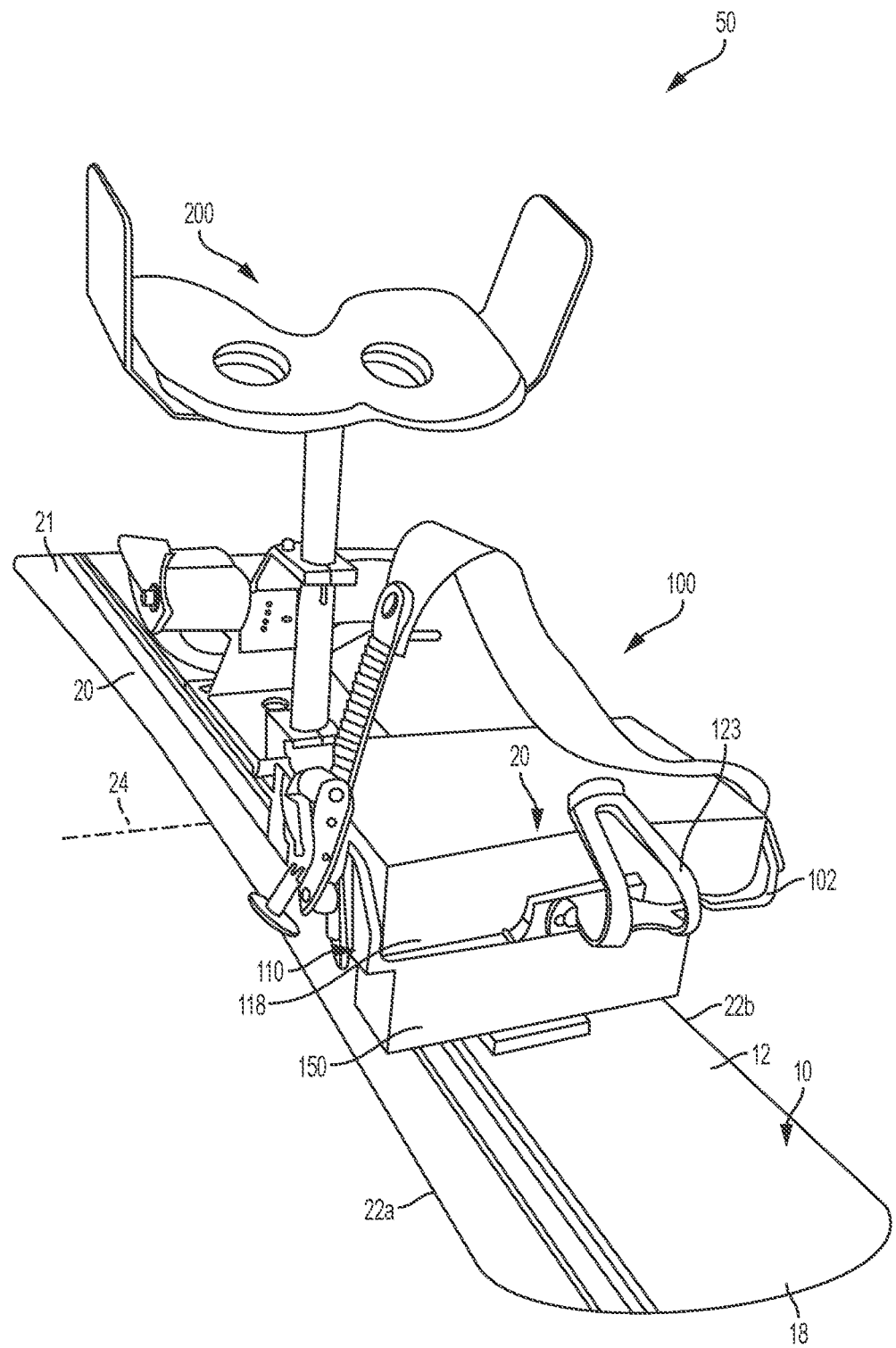
FIG. 1 illustrates a front and side perspective view of a support assembly mounted to a snow sports board and that includes a front assembly with knee support and a rear assembly with seat, in accordance with an embodiment of the present disclosure.

The figures depict various embodiments of the present disclosure for purposes of illustration only. Numerous variations, configurations, and other embodiments will be apparent from the following detailed discussion.

DETAILED DESCRIPTION

Disclosed are assemblies and components of a support assembly for use with a snow sports board, such as a snowboard or ski. The support assembly is configured for use by a rider in a seated or kneeling, face-forward position. In accordance with some embodiments, the support assembly includes a seat and a suspension assembly that includes a shock absorber disposed between the snow sports board and the seat. For example, the assembly includes a frame with an inverted-L shape. A shock absorber is connected to the downward-extending portion of the frame and the seat is mounted on the rearward-extending portion of the frame. The frame is connected to the board by the shock absorber and by linkages extending between the frame and a base mounted to the board. The suspension assembly enables the rider to ride the board in a seated, face-forward position with the rider's knees forward of and lower than the rider's hips. For example, the rider may position the knees on a knee platform with support plates on opposite sides of the suspension assembly and positioned below the seat. In some such configurations, the rider's feet can rest on a foot support below the seat or can remain suspended over the board. In another example, the rider's feet are placed on a foot peg or foot support attached to the board or to a rear portion of the support assembly.

In accordance with some embodiments, the support assembly facilitates the user in transferring weight to the board to initiate and make turns on a snow sports board while in a seated or kneeling, face-forward position. The rider's height above the board can be used for leverage during turning. For example, the rider's center of mass above the board enables the rider to use the support assembly as a lever to put the board on edge. In skiing, the skier's legs and knees act as a shock absorber to absorb centrifugal forces generated during a turn. Similarly, on a snow sports board, the centrifugal force acts on the rider towards the board, but since the rider is not in a standing position on the board, the legs and knees are not used in the same way to absorb the centrifugal force. The suspension assembly is generally configured to dampen vibrations and to absorb and reduce the impact forces to the rider associated with bumps, jumps, and centrifugal force generated during turns, for example. The suspension assembly may also help the rider transfer centrifugal force to forward momentum, and therefore speed, when coming out of a turn.

In accordance with some embodiments, a combined support and suspension assembly is configured to enable the user to board a chairlift while in an active-use position, such as when the rider is seated on the seat with knees (and/or part of the lower leg) on a support platform. For example, the portion of the frame supporting the seat is cantilevered above the board at a height to receive a chairlift seat in the unobstructed region below the seat. The rider may board a chairlift without modifying or changing the configuration of the suspension assembly and may board the chairlift in an active-use position with the seat of the support system on top of the chairlift seat. Numerous embodiments and variations will be apparent in light of the present disclosure.

General Overview

Snow sports boards, such as snowboards and skis, are commonly ridden by the user in an upright, standing position. For a different experience similar to whitewater kayaking, some users desire to ride a snowboard or other snow sports board in a kneeling position. One approach has a shallow platform mounted to the snowboard and shaped to accept the rider's knees. The platform situates the rider in a kneeling position on the board with the feet in a downward-pointing position below the rider's body. Such a device has been found to be inefficient in transferring the user's weight to the board, therefore making it difficult to control of the board. Further, the rider's position on the board has been found to be uncomfortable generally, and painful after extended use due to the forces exerted on the rider's feet and ankles.

Another approach is the sit ski, which was developed for the adaptive community, such as those who may not have use of the lower body. The rider of a sit ski has a face-forward, recumbent position with the rider's hips retained in a bucket-style seat and with the rider's knees and feet extending in front of the rider. The seat is attached to a ski using a traditional binding, where the seat assembly occupies the position normally taken by a ski boot. To achieve a low center of gravity, the rider's hips are positioned vertically below the knees with the upper leg (e.g., femur) extending upward from the hip to the knee. In some cases, the rider's knees are close to or actually contact the rider's chest, such as during turns.

To initiate a turn, the rider must use outriggers, such as a partial length of a ski attached to the lower end of a pole. Due to the rider's body position in a sit ski, and also due to the rider's own physical limitations in some cases, it is difficult to transfer weight to the edge of the ski to initiate a turn. Instead, the rider uses friction of the outrigger against the snow to rebalance the sit ski, create drag, or both to initiate and make a turn. An additional challenge of the sit ski, even for able-bodied riders, is that the body position makes it difficult to initiate a turn without the use of outriggers. The rider's center of gravity is over the ski, but the rider's upper body is behind the ski's center since the rider's legs and part of the seat extend forward. Since the rider is in a reclined or recumbent position with legs extending forward, it is difficult to one's body weight to set the ski on edge for turning. Further, since the rider is in a constrained position over the ski, the sit ski is inherently unstable and prone to tipping when not moving. For these reasons, riders of the sit ski generally consider outriggers to be an essential accessory.

Due to the challenges of the sit ski and of other available designs, a need exists for an improved support system that allows the rider to ride a snow sports board in a seated, forward-facing position. The present disclosure addresses this need and others. In accordance with some embodiments, the rider can sit on a seat mounted on top of the assembly. The rider's legs extend down with the knees somewhat bent along opposite sides of the support assembly's frame. In one example, the rider may place the knees on a platform or peg attached to the support frame. In another example, the rider may place the feet on a foot support attached to the board or on the board. In yet another example, the rider may ride in a seated position with the feet on the board below the seat. The riding position is generally comfortable and familiar to those who ride bicycles, motorcycles, or horses. Unlike a sit ski, the rider has enhanced control over the board and improved balance, due at least in part to the rider's athletic stance with a more upright and forward body position. Also unlike other assemblies, some support assemblies of the present disclosure elevate the rider above the board in a seated position that enables the rider to transfer weight to the board for turning. In accordance with some embodiments, the rider's seated position is akin to being seated at the edge of a seat with the ability of the rider to weight the feet (or knees) as needed to shift weight to the board and/or to balance.

While generally referred to as a support assembly for consistency and ease of understanding the present disclosure, the disclosed assembly is not limited to that specific terminology and alternatively can be referred to, for example, as a suspension assembly, a combined support and suspension assembly, a rider support assembly, a seated support system, or other terms.

Additionally, while referred to herein as a snow sports board, the disclosure is not limited to that specific terminology and alternatively can be referred to, for example, as a board, a snowboard, a ski, a runner, or other terminology. As will be further appreciated, the particular configuration (e.g., materials, dimensions, etc.) of assemblies configured as described herein may be varied, for example, depending on whether the target application is for recreational, competition, or specialized uses. Numerous configurations will be apparent in light of this disclosure.

Structure and Function

Figure 2:
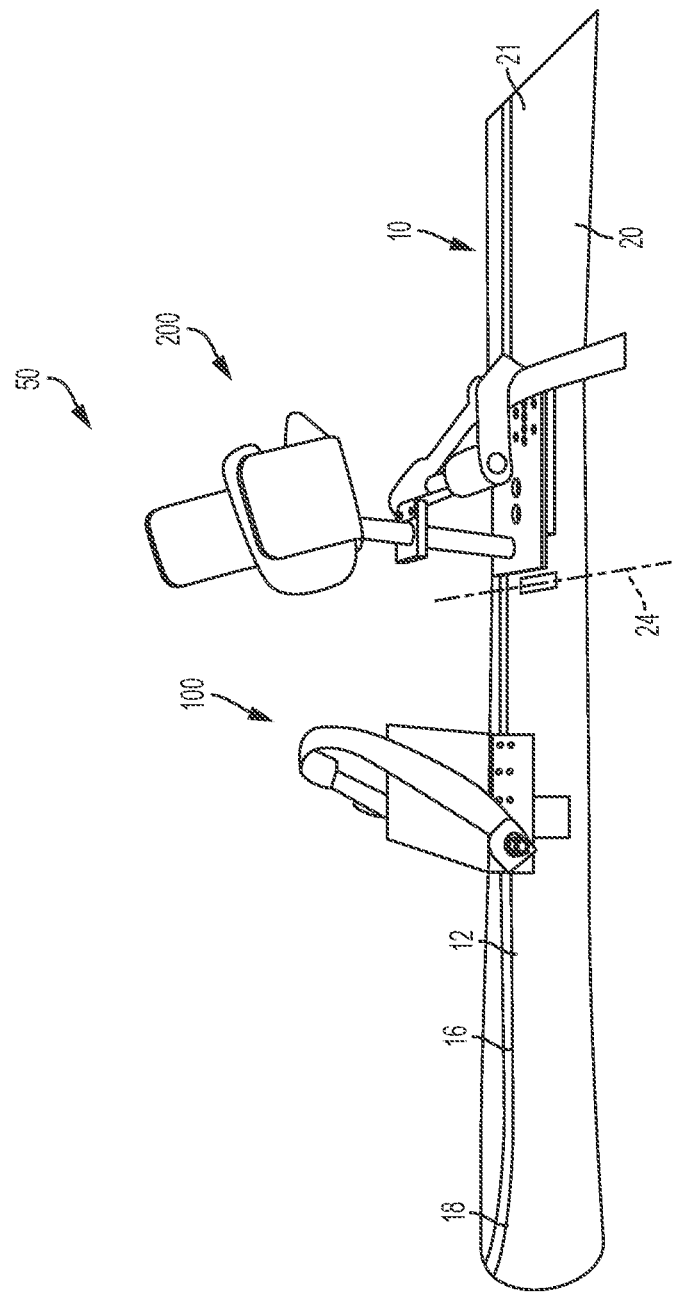
FIG. 2 is a side and top perspective illustration of the support system shown in FIG. 1.

FIGS. 1-2 illustrate a front, top, and right-side perspective view and a top and left-side perspective view, respectively, of a binding and support assembly 50 shown mounted to a traditional snowboard or board 10 in accordance with an embodiment of the present disclosure. In one embodiment, binding and support assembly 50 includes a front assembly 100 and a rear assembly 200 configured to be secured to board 10. Binding and support assembly 50 is configured to support the rider on board 10 in a kneeling, face-forward position, where the rider's knees/shins are supported by front assembly 100. Rear assembly 200 is configured to support the rider's feet and/or ankles and can include a seat to support the rider in a seated position.

In embodiments, front assembly 100 and a rear assembly 200 are separate assemblies mounted to board 10 in a spaced-apart relationship, where front assembly 100 is mounted to forward portion 16 forward of midline 24 and rear assembly 200 is mounted to rearward portion 20 rearward of midline 24. For example, front assembly 100 is separate from and spaced from rear assembly 200. With the support assembly 50 extending across midline 24, the rider can shift weight forward or backward across midline 24 as needed to control board 10. In other embodiments, front assembly 100 and rear assembly 200 are connected by a common base plate or base structure extending across midline 24.

Board 10 has a top surface or deck 12, a bottom surface 14, a forward portion 16 with a tip 18, and a rearward portion 20 with a tail 21. The forward portion 16 generally includes portions of board 10 forward of a midline 24 and the rearward portion 20 includes portions of board 10 rearward of midline 24. Board 10 can be configured with edges 22a, 22b extending along the bottom surface at each lateral side. Board 10 can be configured as a freestyle snowboard, a racing snowboard, a ski, or other board 10. For example, board 10 has a length from 130 cm to 180 cm. Other lengths are acceptable. Some embodiments of the support assembly 50 of the present disclosure may be used with and attached to boards or other vehicles designed to traverse snow, water, sand, ice, dirt, grass, concrete, pavement, or other indoor or outdoor surface.

In some embodiments, the support assembly 50 attaches to deck 12 using fasteners extending through front and rear base plates and into pre-drilled, threaded holes (not visible) in board 10. For example, board 10 is a snowboard configured with threaded holes ready for attachment of snowboard bindings. In other embodiments, deck 12 is modified or prepared specially to receive fasteners in a pre-arranged pattern suited for the support assembly 50. For example, holes are drilled and tapped in a pattern that corresponds to fastener openings in components of the support assembly 50.

Figure 3:
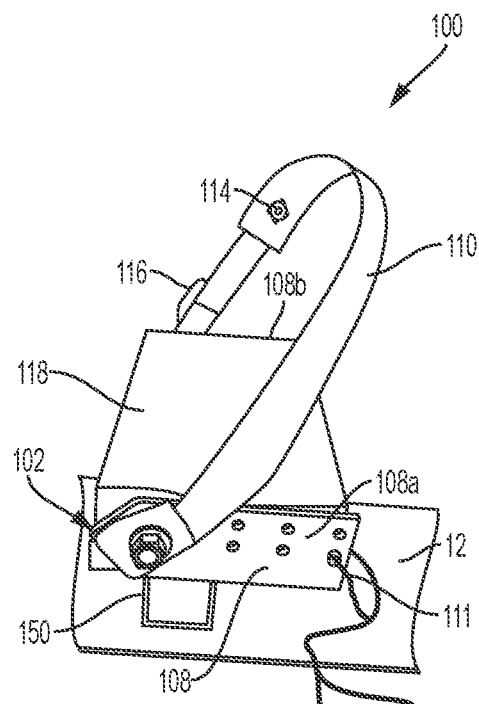
FIG. 3 illustrates a top and side perspective view of a front portion of the support assembly, in accordance with an embodiment of the present disclosure.
Figure 4:
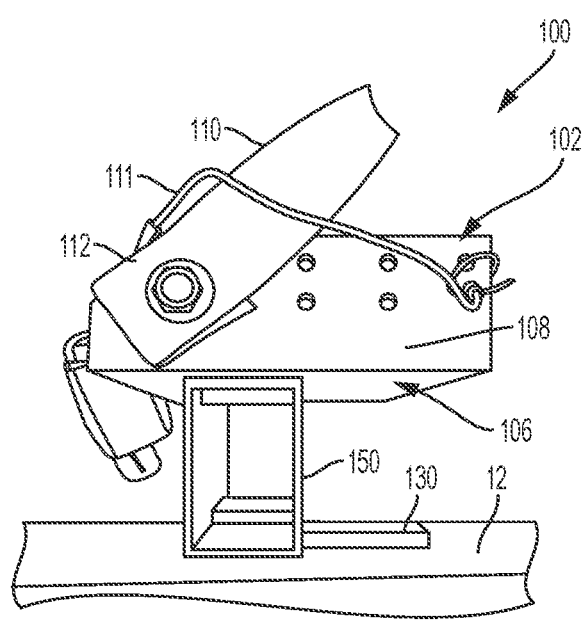
FIG. 4 illustrates a side elevational view of the front portion of FIG. 3 and shows a riser block and mounting plate, in accordance with an embodiment of the present disclosure.

Referring now to FIGS. 3-4, a top and left-side perspective view and a left-side elevational view show front assembly 100 that includes a knee support 102, a riser 150, and a mounting plate 130 in accordance with an embodiment of the present disclosure. In one embodiment, knee support 102 includes a knee platform 106 configured to receive the rider's knees/shins. Knee platform 106 can be a flat plate or can be contoured for the rider's knees. Optionally, knee platform 106 includes sidewalls 108, such as left sidewall 108a and right sidewall 108b. Sidewalls 108 are useful to retain an optional knee pad 118 on knee platform 106. Knee pad 118 is provided for the rider's comfort and may be omitted or modified as desired. Sidewalls 108 also provide a point of attachment for calf strap 110 and a retention cord 111, for example. In one embodiment, a first strap portion 112 is secured to left sidewall 108a and second strap portion 114 is secured to right sidewall 108b. A strap fastener 116 can be used to tighten and retain calf strap 110 secured around the rider's calves. Strap fastener 116 can be secured to sidewall 108 in place of one of strap portions 112, 114. In other embodiments, strap fastener 116 is secured to calf strap 110 between first strap portion 112 and second strap portion 114. For example, strap fastener 116 is a ratchet-type fastener used with calf strap 110 having teeth. In some embodiments, knee support 102 is made of a rigid material, such as aluminum, steel, reinforced composites, fiberglass, or plastic.

In one embodiment, calf strap 110 includes a rigid plastic strap and buckle to secure the rider's calves to knee platform 106 when descending the ski slope in the kneeling position. Calf strap 110 allows the rider to lift the calf to help turn and stop board 10 by putting it on edge. Calf strap 110 is also useful to attach around one of the rider's heels to secure the rider's boot to knee support 102 without sliding off in the backwards direction when boarding and riding the chairlift. In some embodiments, for example, calf strap 110 is used together with toe clip 123 (shown in FIG. 1) to retain the rider's foot to knee support 102.

In some embodiments, knee support 102 is secured atop riser 150 to elevate knee support 102 above deck 12 for improved leverage in shifting the rider's weight to edges 22a, 22b of board 10. Riser 150 is used to secure knee support 102 to board 10 and raise the height of the rider above board 10 to provide more leverage to aid in turning by putting the board on edge. In some embodiments, riser 150 is configured to mate with 3-hole and/or 4-hole mounting patterns found on most snowboards available today.

In one embodiment, riser 150 can be a rectangular block, hollow horizontal tube, one or more vertical post, or other structure that is secured between knee platform 106 and board 10. In some embodiments, riser 150 comprises two or more shock absorbers disposed between deck 12 and knee platform 106. Riser 150 can be directly mounted to board 10 or may be secured to mounting plate 130. An advantage of using mounting plate 130 is that it facilitates longitudinal position adjustments for front assembly 100 along board 10 for riders of different sizes. Mounting plate 130 also facilitates easy attachment to riser 150 and to board 10 using separate fastener openings. In other embodiments, riser 150 is mounted directly to board 10 or includes mounting plate 130 as a single structure.

Figure 5:
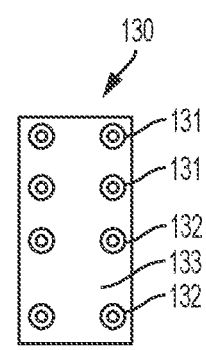
FIG. 5 illustrates a top plan view of a mounting plate for the front portion of the assembly, in accordance with an embodiment of the present disclosure.

FIG. 5 illustrates a top plan view of an example mounting plate 130 in accordance with an embodiment of the present disclosure. Mounting plate 130 includes four bottom openings 131 recessed in a bottom surface for attachment to a bottom of riser 150. Four top openings 132 are recessed into top surface 133 for securing mounting plate 130 to board 10. Top openings 132 can correspond to a traditional four-hole pattern of snowboards on the market today or can be arranged in some other suitable pattern. Although top and bottom openings 131, 132 are shown as round through-openings with a recess for the fastener head, top and bottom openings 131, 132 can be slots. For example, mounting plate 130 optionally defines one or more slots along its center for adjusting the position of the knee support 102 along the X-axis (forward or backward along the board 10). Other numbers and placements of fastener openings and other configurations will be apparent in view of the present disclosure.

Figure 6:
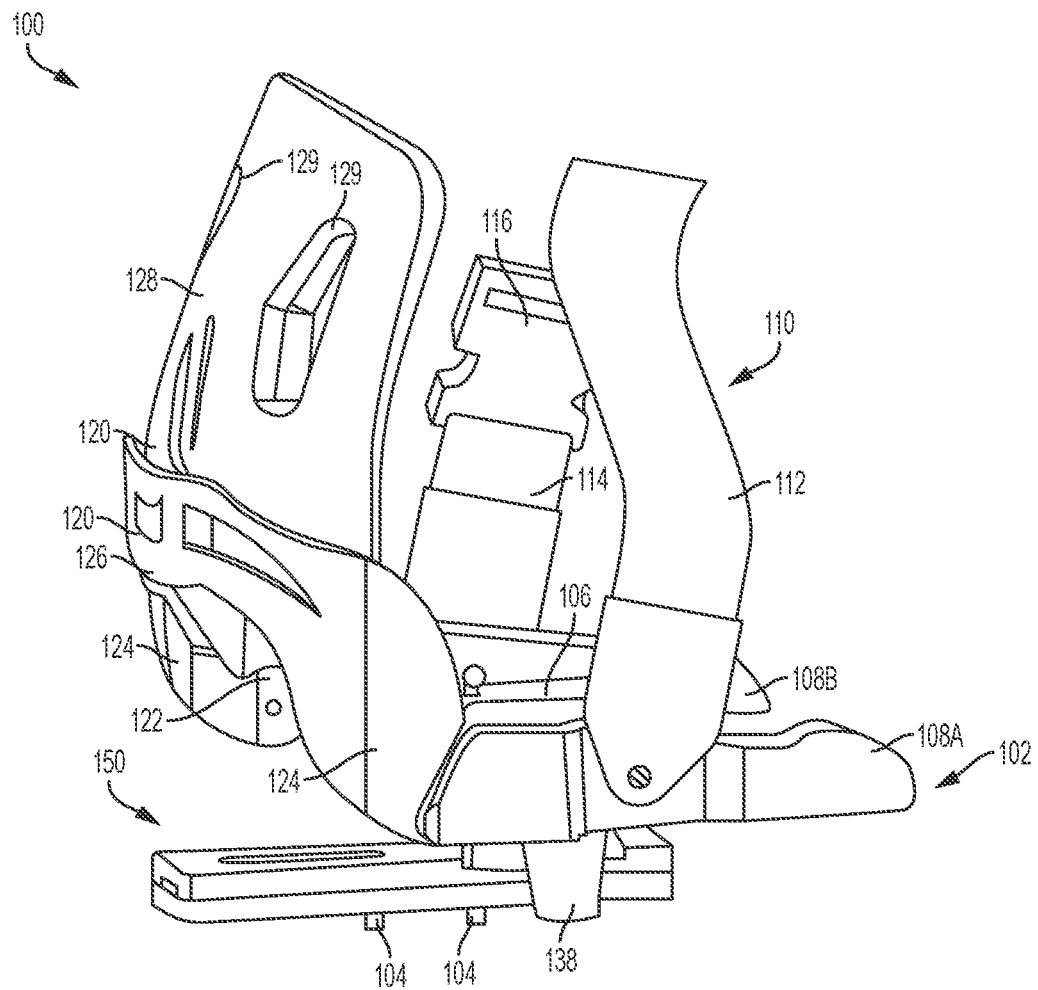
FIG. 6 illustrates a front and left-side perspective view of a front portion of a support assembly, where the front assembly includes a leg-support portion, in accordance with an embodiment of the present disclosure

Referring now to FIG. 6, a left-side and front perspective view illustrates another embodiment of front assembly 100 that includes a knee support 102 attached to and vertically spaced from board 10 by riser 150. Knee support 102 is generally made of rigid materials, such as plastic, carbon fiber composite, fiberglass, metal, or combinations of these and other materials. Spacers 138 are attached with mounting screws directly to board 10 to provide torsional support with respect to riser assembly 150. Spacers 138 can be constructed of a resilient material to absorb vibration of board 10. In some embodiments, spacers 138 are made of a rubber block or the like, but could also be made of metal, plastic, or other rigid material.

Knee support 102 includes knee platform 106 that provides a flat or contoured surface upon which the rider places the knees and upper part of the shin. In one embodiment, knee platform 106 extends rearward toward rear assembly 200 and supports a major portion of the user's shin/tibia. In some embodiments, knee platform 106 has sidewalls 108 that extend along its edges to define a U-shape. Sidewalls 108 provide structural support to knee support 102 and aid in preventing twisting from torsional forces. Sidewalls 108 also define a surface against which the user's knee and leg can press while riding. Further, sidewalls 108 provide a point of attachment for a calf strap 110 and other accessories. In the embodiment shown in FIG. 6, calf strap 110 has first strap portion 112 secured to left sidewall 108a and second strap portion 114 secured to right sidewall 108b, where first and second strap portions 112, 114 releasably connect to each other using strap fastener 116. Strap fastener 116 can be, for example, a snap buckle, pair of D-rings, ratchet lever and geared strap, hook-and-loop fastener, or some other suitable fastener. Strap fastener 116 allows the user to adjust the length of calf strap 110 to tighten calf strap 110 over the lower legs to retain the rider on front assembly 100.

Optionally, knee support 102 includes a front portion 120 that connects to and extends between sidewalls 108 of knee platform 106. In one embodiment, front portion 120 is a curved plate or bar that extends around the front of the knee platform 106. In one embodiment, front portion 120 includes rounded corner portions 124 connected by a cross piece 126 extending laterally between them. Front portion 120 optionally includes a leg-support portion 128 that extends upward from crosspiece 126. Leg-support portion 128 is constructed to contact the rider's thighs when the rider leans forward in a high kneeling position. When the rider changes to a high kneeling position with the thighs against leg-support portion 128, the rider may brace against leg-support portion 128 to transfer weight to board 10 and load an edge 22a, 22b of board 10 to initiate turns. In the high kneeling position, the rider is positioned to absorb bumps and impact by bending at the waist and knees. Leg-support portion 128 also allows the rider to assume the high kneeling position without falling forward. Further, moving between the low kneeling position and the high kneeling position allows the user to maintain balance and/or assume a strategic position for traversing certain terrain by pushing forward against board 10 when using a pole, a paddle, or the hands to dig into the snow for propulsion. Leg-support portion 128 also provides some protection to the rider from snow, shrubs, or debris on the mountain.

In one embodiment, front portion 120 defines a forward toe opening 122 that is positioned vertically between knee platform 106 and front portion 120. Forward toe opening 122 is sized to receive the toe of a boot or shoe. As such, corner portions 124 and cross piece 126 of knee support 102 prevent the rider's knees from sliding forward off knee platform 106 during use. Knee support 102 is also constructed as such to provide a foot hold to allow riders to ride the chairlift with the toe of one of the rider's boots extending through toe opening 122. In other embodiments, toe opening 122 is provided by a toe clip 123 or the like attached to knee platform 106 and positioned to receive the rider's boot. As shown for example in FIG. 1, toe clip 123 similar to those used in bicycling is secured to knee platform 106 and provides toe opening 122.

In one embodiment, leg-support portion 128 has an adjustable position relative to crosspiece 126. For example, leg-support portion 128 has an adjustable canting device to change the angle between leg-support portion 128 and knee platform 106. As such, the rider can tilt or pivot leg-support portion 128 forward or backward to increase or decrease the intensity of the forward energy transfer and therefore the responsiveness of board 10. Optionally, leg support portion 128 defines openings 129 that may be used for an additional thigh strap extending around the rider's thighs to secure leg-support portion 128 to the rider. This same thigh strap can be used to extend around the rider's lower leg when the rider's toe is in the forward toe opening 122 when riding chairlifts. Openings 129 may also be used as hand holds when the rider is in a kneeling position or when carrying board 10. Openings 129 may further be used to connect a retention cord 111 (shown in FIGS. 3-4) or the like to board 10.

Crosspiece 126 and leg-support portion 128 may be one monolithic structure with a permanent, fixed position for leg-support portion 128. Alternately, crosspiece 126 and leg-support portion 128 may be a plurality of individual components that are attached together as part of knee support 102. Similarly, knee support 102 can be a single monolithic structure in some embodiments and a group of separate components in other embodiments. Knee platform 106 may have a flat surface or a contoured surface shaped for one's knees. Optionally, knee support 102 is padded for comfort. Optionally, the knee platform 106 includes a short wall, ridge, or partition (not shown) that extends longitudinally along knee platform 106 between the rider's knees.

In one embodiment, knee support 102 is attached to board 10 with fasteners 104 (e.g., screws) that extend through knee platform 106 and riser 150. In some embodiments, riser 150 is omitted and knee support 102 attaches directly to board 10. In yet other embodiments, riser 150 is formed as part of the knee support 102. In still other embodiments, riser 150 is a separate assembly that is secured to the bottom of the knee platform 106, where attaching knee support 102 to board 10 involves securing knee support 102 and riser 150 as an assembled group to board 10.

Figure 7:
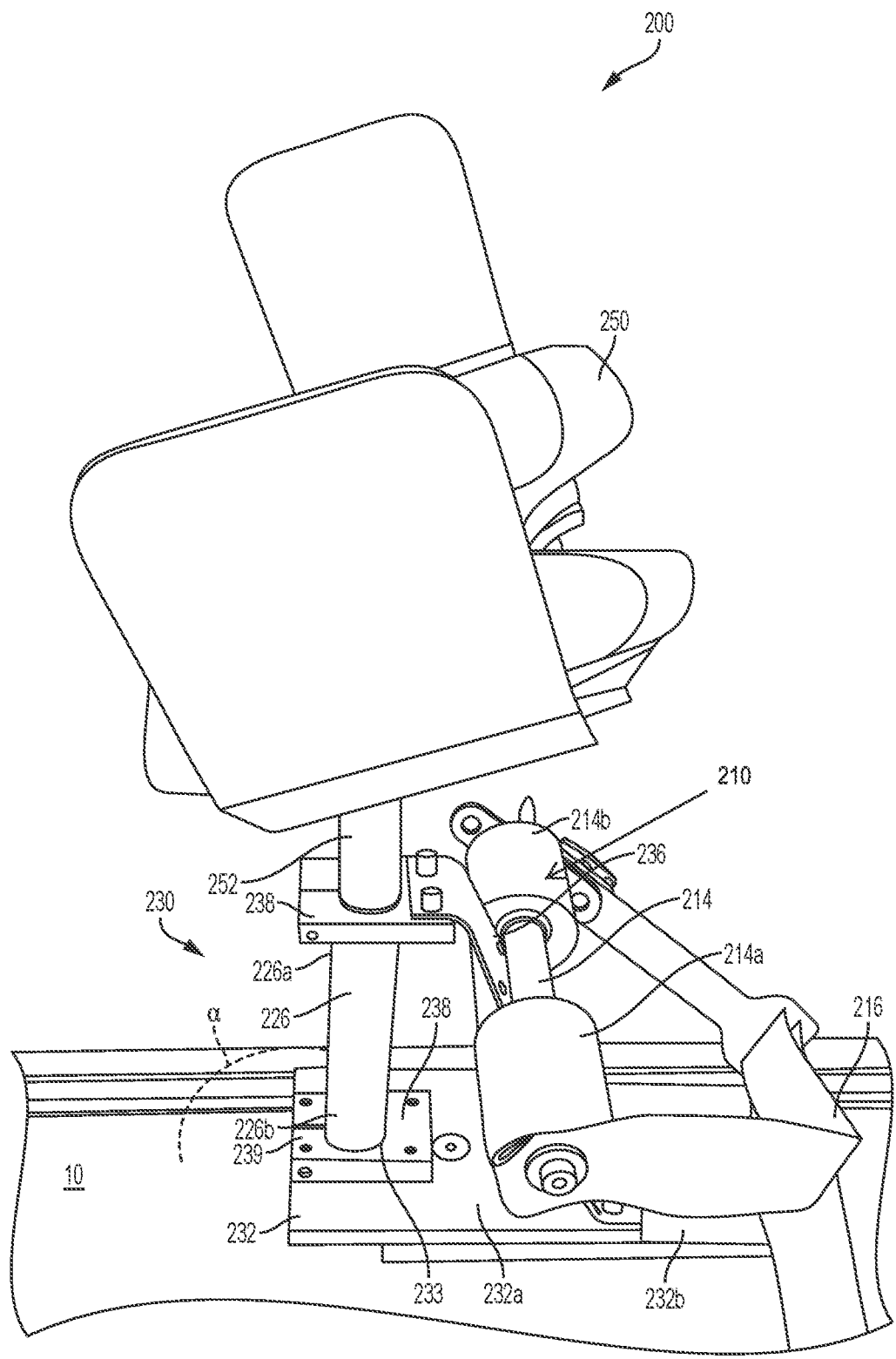
FIG. 7 illustrates a top and side perspective view of a rear portion of a support assembly that includes a seat, in accordance with an embodiment of the present disclosure.

Referring now to FIG. 7, a top and left-side perspective view illustrates rear assembly 200 with foot support 210 and seat 250 in accordance with an embodiment of the present disclosure. Rear assembly 200 includes a base 230 that includes a base plate 232 and riser tube 226 attached to base plate 232 and extending upward therefrom. In some embodiments, riser tube 226 extends vertically from base plate 232. In other embodiments, riser tube 226 can extend upward at an angle α of less than 90° as defined between riser tube 226 and board 10 in front of riser tube 226. In some embodiments, a stay 236 extends between base plate 232 and an upper end portion 226a of riser tube 226. For example, stay 236 substantially defines a triangle with riser tube 226 and base plate 232. Stay 236 provides structural support to riser tube 226, especially when rear assembly 200 is equipped with seat 250 constructed to bear weight of the rider. Stay 236 can include a plate, one or more bars, one or more tubes, or other rigid structure(s) between base plate 232 and riser tube 226. Numerous configurations will be apparent in light of the present disclosure.

In some embodiments, base plate 232 includes one or more plates. For example, base plate includes a first base plate 232a that connects to riser tube 226, stay 236, and post clamp 238 using fasteners extending upward through the bottom of first base plate 232a. A second base plate 232b is secured to board 10 by fasteners extending through a top surface. First base plate 232a can then be secured to second base plate 232b using fasteners extending through first base plate 232a and into second base plate 232b and optionally also extending into board 10. The use of first base plate 232a and second base plate 232b provides an adjustable position of rear assembly 200 along second base plate 232b.

In one embodiment, riser tube 226 is a hollow tube constructed to receive a seat post 252 of seat 250. For example, riser tube 226 includes a flanged lower end 226b that can be secured to base plate 232 using a post clamp 238 installed around riser tube 226 and attached to base plate 232 with fasteners. For example, riser tube 226 extends upward through the post opening 233 of lower post clamp 238 with the flange engaging the bottom surface of first base plate 232. In one embodiment, post clamp 238 defines a slot 239 to post opening 233, where slot 239 can be drawn together using a fastener to tighten post clamp 238 to riser tube 226. Upper end portion 226a of riser tube 226 similarly can include post clamp 238 for attachment of stay 236. For example, post clamp 238 on upper end portion 226a slidably receives riser tube 226 therethrough and can be tightened on riser tube 226 at a position appropriate to attach to stay 236. In some embodiments, for example, riser tube 226 can be longer than as shown in FIG. 7, where post clamp 238 is positioned towards upper end portion 226a along the length of riser tube 226.

In some embodiments, riser tube 226 is constructed as a piston or shock absorber with seat post 252. For example, riser tube 226 contains a spring, gas piston, or other resilient and compressible structure disposed between the end of seat post 252 and lower end 226b of riser tube or base plate 232.

Horizontal support bar 214 is attached to base 230 and extends laterally with left end portion 214a and right end portion 214b positioned to support the rider's feet/ankles. Horizontal support bar 214 can be secured to stay 236 or to riser tube 226. Optionally, horizontal support bar 214 is omitted and replaced by angled footholds 215 (shown in FIG. 18) attached to board 10 or to base plate 232. In yet other embodiments, foot supports or footholds 215 can be used in addition to horizontal support bar 214. For example, rear assembly 200 includes footholds in the shape of a wedge, a strap, a block, tread, or other structure that provides purchase for the rider's feet in the kneeling or sitting position.

In some embodiments, ankle strap 216 is connected to left end portion 214a and right end portion 214b of horizontal support bar 214. Ankle strap 216 can be used to releasably hold the rider's feet or ankles against horizontal support bar 214 and/or maintain the rider's toes against the board 10. The rider can also use ankle strap 216 and calf strap 110 (shown in FIGS. 1-4) to lift part of board 10 (e.g., one edge 22) from the snow as the rider leans to one side or the other.

Figure 8:
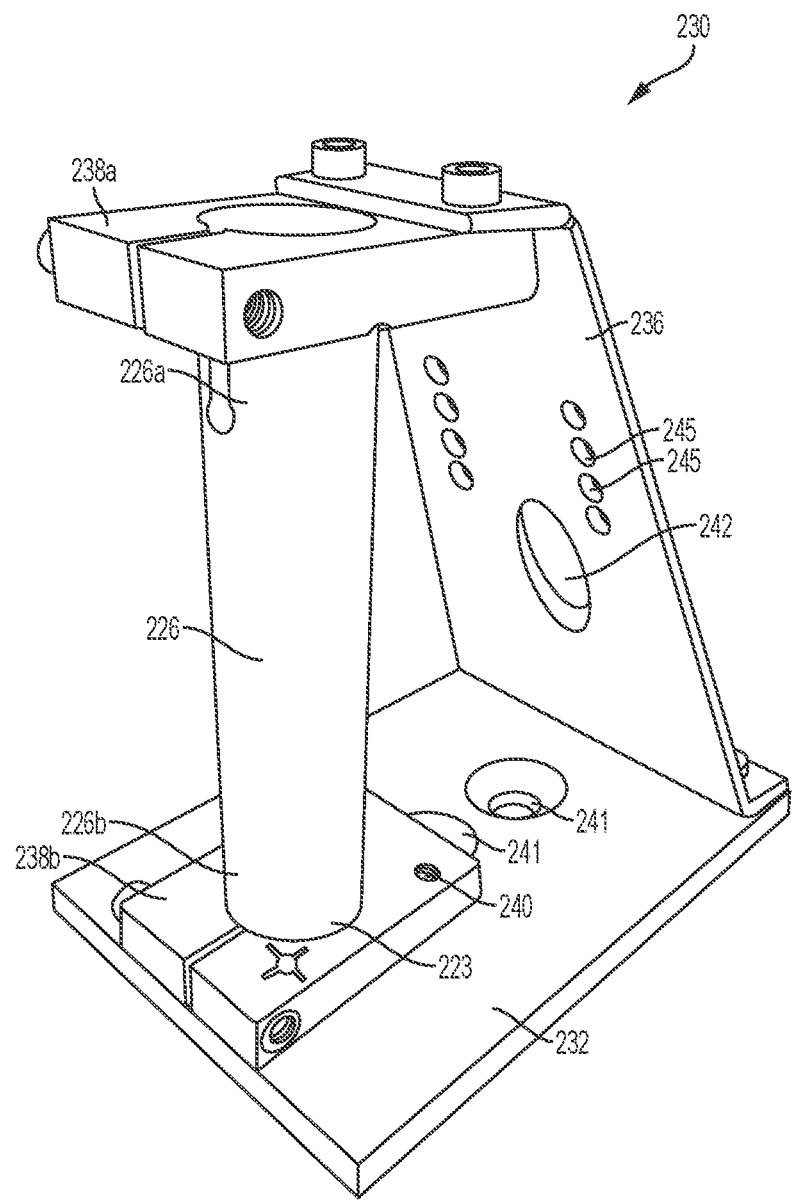
FIG. 8 illustrates a front, top, and side perspective view of a base for the rear portion, where the base includes a riser tube and stay, in accordance with an embodiment of the present disclosure.

Referring now to FIG. 8, a top, front, and left-side perspective view shows base 230 of FIG. 7. Riser tube 226 extends up from base plate 232 and is secured by lower post clamp 238b. Lower post clamp 238b is fixed to base plate 232 by fasteners 240 extending up through base plate 232 into lower post clamp 238b. Base plate defines recessed mounting openings 241 Stay 236 is attached between base plate 232 and upper post clamp 238a using fasteners. Stay 236 defines a plurality of mounting openings 241 for attachment of horizontal support bar 214 with an adjustable vertical position. Stay also defines an access opening 242 to facilitate access to fasteners secured through mounting openings 241.

Figure 9:
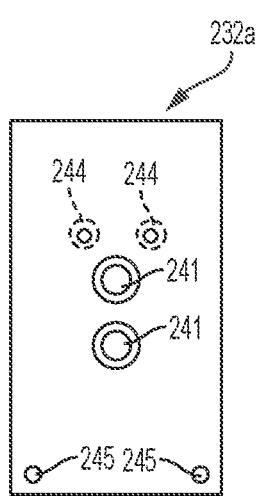
FIG. 9 illustrates top plan view of a first base plate for the rear portion of the assembly, in accordance with an embodiment of the present disclosure.
Figure 10:
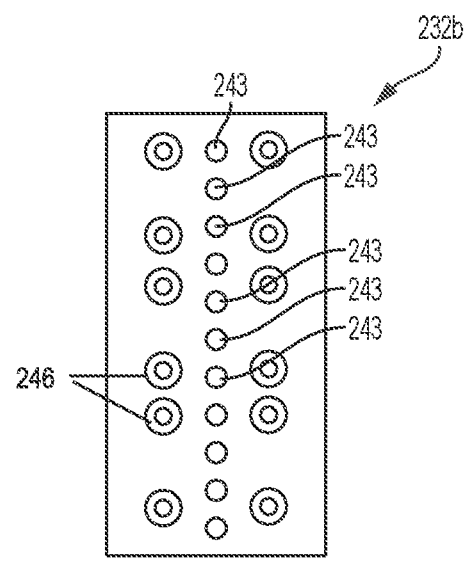
FIG. 10 illustrates a top plan view of a second mounting plate for the rear portion of the support assembly, in accordance with an embodiment of the present disclosure

FIGS. 9 and 10 illustrate top plan views of first base plate 232a and second base plate 232b, respectively. First base plate 232a defines mounting openings 241 recessed into a top surface and corresponding to openings 243 in second base plate 232b. Openings 244, 245 are recessed into a bottom surface and correspond to lower post clamp 238b and to stay 236, respectively. Second base plate 232b defines a plurality of openings 246 recessed into a top surface for securing second base plate 232b to board 10. Based on the rider's height, first and second base plates 232a, 232b may be secured to board 10 and to each other as needed to provide spacing from front assembly 100 suitable to the rider.

Figure 11:
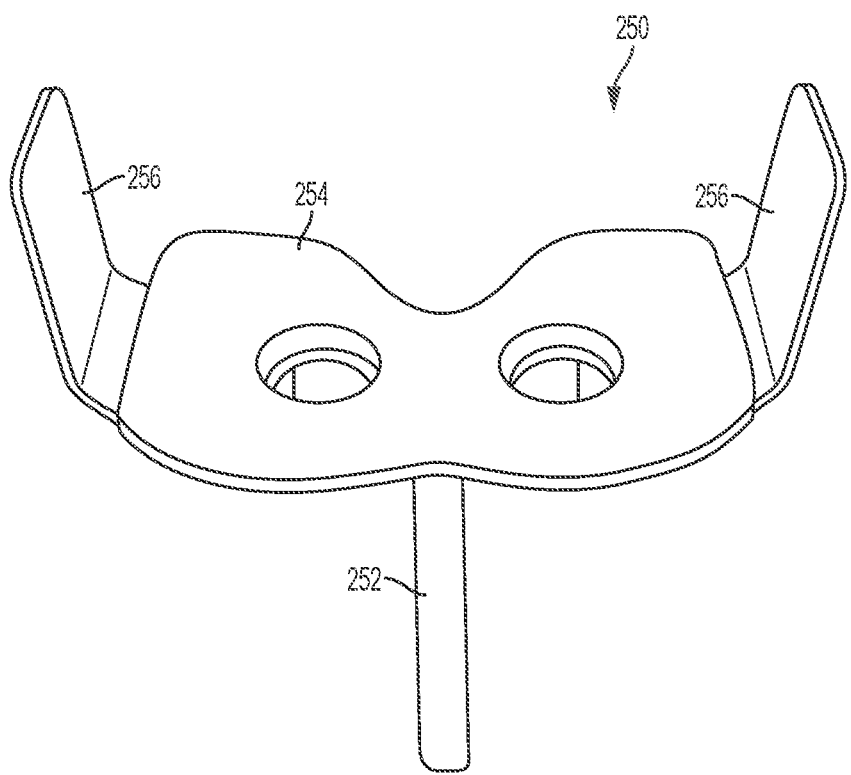
FIG. 11 illustrates a top and front perspective view of a seat, in accordance with an embodiment of the present disclosure.

Referring now to FIG. 11, a top and front perspective view illustrates seat 250 in accordance with an embodiment of the present disclosure. Seat 250 includes a seat platform 254 secured to seat post 252, where seat platform 254 is constructed to support the rider in a sitting position. Seat platform 254 can be flat or contoured for comfort. Optionally, seat platform 254 is padded. In some embodiments, seat platform 254 includes side plates 256 extending up to provide a lateral restraint for the rider's hips. Side plates 256 also can facilitate transferring the rider's weight to board 10 for initiating turns. Seat post 252 has a length suitable to support the rider in a seated position. Seat post 252 is received in riser tube 226. In some embodiments, the height of seat platform 254 above board 10 is adjustable by changing the length of seat post 252 received in riser tube 226 and using upper post clamp 238 to secure its position. In one embodiment, seat platform 254 is tilted forward (also shown in FIG. 2) consistent with the position and angle of the rider in a forward-facing, kneeling position.

Figure 12:
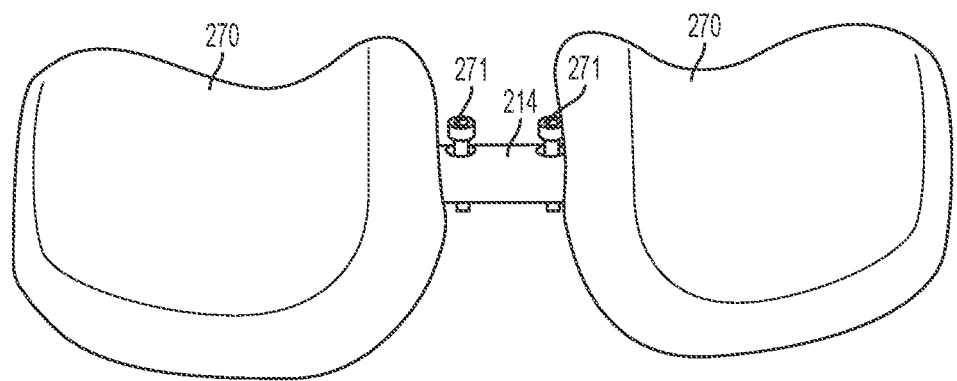
FIG. 12 illustrates a top plan view of a horizontal support bar with attached ankle cups, in accordance with an embodiment of the present disclosure.
Figure 13:
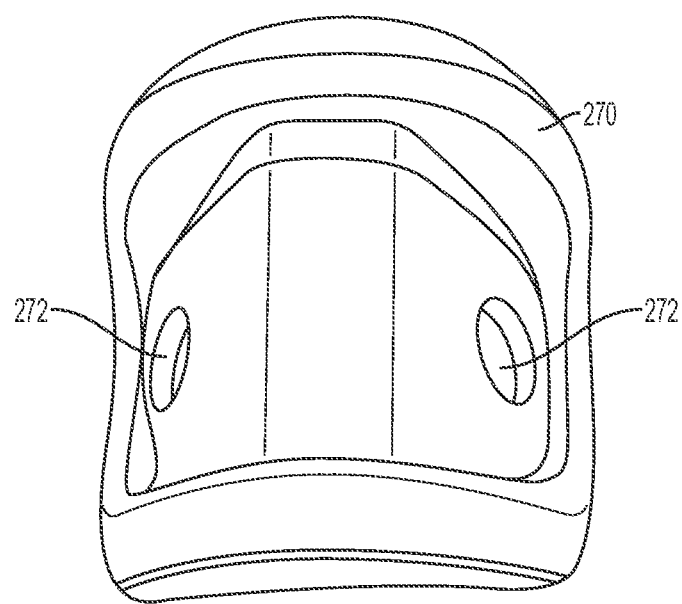
FIG. 13 illustrates a bottom view of an ankle cup shown in FIG. 12 and shows openings for the horizontal support bar, in accordance with an embodiment of the present disclosure.

Referring now to FIGS. 12 and 13, top and bottom views, respectively, illustrate ankle cups 270 in accordance with an embodiment of the present disclosure. FIG. 12 shows a pair of ankle cups 270 attached to horizontal support bar 214. Fasteners 271 extend through horizontal support bar 214 for attachment to stay 236 or other component of base 230. FIG. 13 shows a bottom view of ankle cup 270 with openings 272 for horizontal support bar 214. In one embodiment, horizontal support bar 214 extends through openings 272. As such, ankle cups 270 are secured, yet can rotate as needed to align with the rider's ankle.

Figure 14:
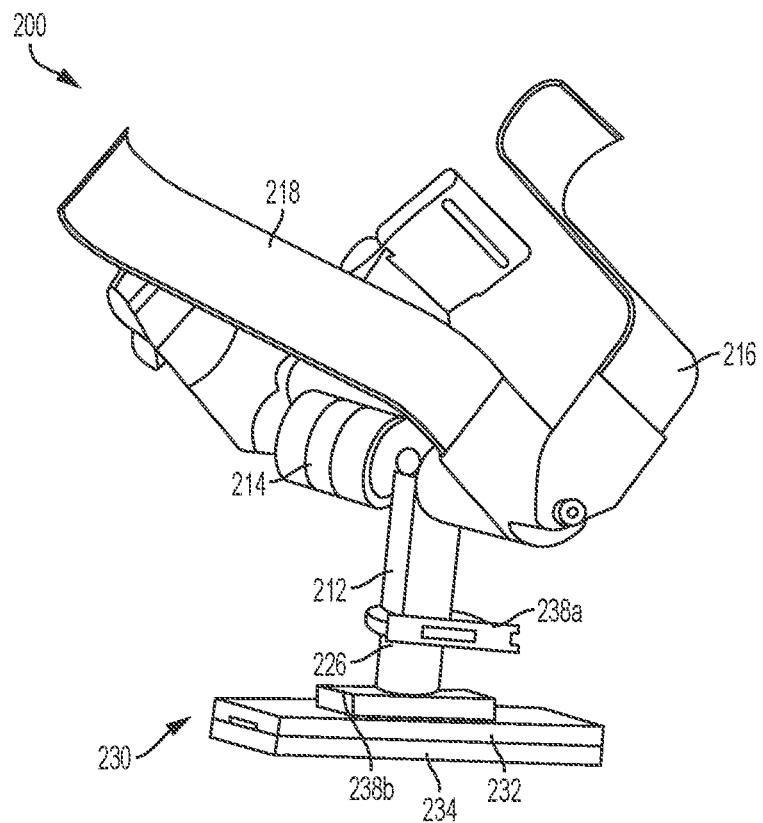
FIG. 14 illustrates a front and side perspective view of a rear portion of a support assembly, in accordance with an embodiment of the present disclosure.

Referring now to FIG. 14, a front and left-side perspective view illustrates another embodiment of rear assembly 200 in accordance with the present disclosure. In this embodiment, seat 250 is omitted and foot support 210 includes an adjustable vertical tube 212 connected to a horizontal support bar 214 in a T shape. Vertical tube 212 is slidably received in riser tube 226. For example, rear assembly 200 includes footholds 215 (shown in FIG. 18). In another example, rear assembly 200 includes ankle cups 270 as illustrated in FIGS. 12-13. In some embodiments, rear assembly 200 includes both footholds 215 and ankle cups 270 or horizontal support bar 214. In any of these embodiments of rear assembly 200, ankle strap 216 and/or additional strap 218 can be included or excluded.

As with embodiments discussed above, riser tube 226 extends vertically from base 230 configured to be attached to rearward portion 20 of board 10. In this embodiment, base 230 includes base plate 232 and a gasket or interface plate 234 disposed against board 10. Interface plate 234 can be made of resilient or rigid materials including rubber, plastic, and metal.

Horizontal support bar 214 is spaced vertically above board 10. Riser tube 226 is secured to base plate 232 using lower post clamp 238b, which is also secured to base plate 232. In other embodiments, vertical tube 212 is fixedly attached to horizontal support bar 214, such as by welding. In other embodiments, horizontal support bar 214 extends through the vertical tube 212 with its position secured by fasteners.

In one embodiment, the distance above board 10 is adjustable by telescoping vertical tube 212 into or out of riser tube 226 and locking its position using upper post clamp 238a, fasteners, or other suitable structure. Some riders may prefer to raise horizontal support bar 214 so that the toes do not touch the board 10, thereby putting the rider's weight on the heel & ankles instead of the toes. Other riders may want to have the toes touching the snowboard so that the rider can push off or brace with the toes to help the rider control the snowboard and shift weight.

Ankle strap 216 is connected to opposite ends of horizontal support bar 214 for securing the rider's feet and ankles to rear assembly 200. An optional second strap 218 is oriented approximately 90° to ankle strap 216 as viewed from the side and also connects to and extends between opposite ends of the horizontal support bar 214. In one example, ankle strap 216 can be secured around the bottom of the rider's boots and second strap 218 can be secured around the rider's waist or legs. Numerous variations, configurations, and other embodiments will be apparent from the present disclosure.

Figure 15:
FIG. 15 illustrates a pole useful in maneuvering a snow sports board equipped with a support assembly, in accordance with an embodiment of the present disclosure.

Referring now to FIG. 15, a pole 290 is illustrated in accordance with an embodiment of the present disclosure. Pole 290 extends longitudinally from a first end portion 292 to a second end portion 294. In other embodiments, each end portion 292, 294 defines a notch or tip 293 to engage the snow. For example, pole 290 has a tip 293 extending axially from each end portion 292, 294 to engage packed snow. Optionally, each tip 293 includes a basket to prevent tip 293 from extending too far into the snow and to reduce the likelihood of pole 290 freely sliding down a slope. Optionally end portions 292, 294 may include paddle blades so that a two-bladed paddle can be used in powder, to paddle across flat terrain, or to assist in steering and balance. Pole 290 can be made of carbon fiber composite, PVC, fiberglass, aluminum, steel, or other suitable material. In one embodiment, pole 290 has an outer diameter from about 30 mm to 35 mm and a length of about 1.4 m to 1.7 m. Other diameters and lengths are acceptable.

Figure 16:
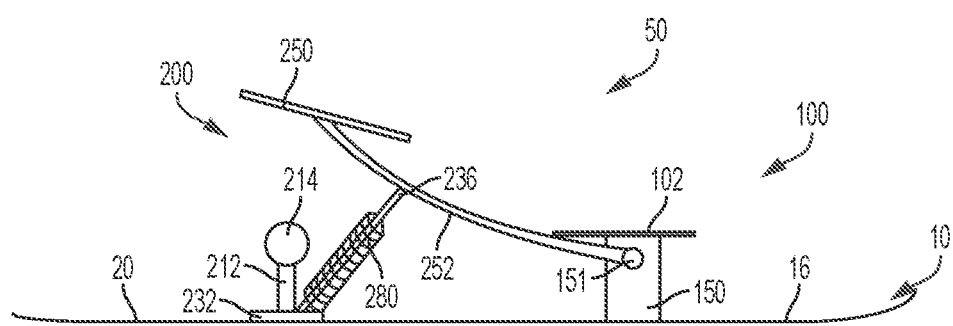
FIG. 16 illustrates a side elevational view of a support assembly mounted to a snow sports board, where the assembly includes a seat post extending to the front assembly and a shock absorber extending between the seat and the base of the rear assembly, in accordance with an embodiment of the present disclosure.

Referring now to FIG. 16, a side elevational view shows an example of a support assembly 50 in accordance with yet another embodiment of the present disclosure. As with embodiments discussed above, front assembly 100 includes knee support 102 on riser 150 secured to forward portion 16 of board 10. Rear assembly 200 includes base plate 232 with vertical tube 212 extending to horizontal support bar 214. Seat post 252 of seat 250 extends forward to riser 150 of front assembly 100 and is pivotably attached. Although seat post 252 is illustrates as having a concave curvature, seat post 252 can alternately be straight or have a convex curvature. In one example, seat post 252 has a concave curvature to provide additional clearance for a chairlift seat to fit below seat 250.

Figure 17:
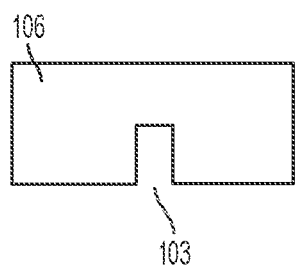
FIG. 17 illustrates a top plan view of a knee plate, in accordance with an embodiment of the present disclosure.

In one embodiment, seat post 252 connects to and rotates about a shaft 151 extending laterally through riser 150. Stay 236 extends from seat post 252 rearward and downward to base plate 232 of rear assembly 200. Stay 236 can be constructed to include a shock absorber 280 extending between seat 250 (or seat post 252) and base 230. In some embodiments, stay 236 has an adjustable length to raise or lower seat 250 from board 10. Additionally, shock absorber 280 can be adjusted for a softer or stiffer ride. In some embodiments as shown in FIG. 17, for example, knee platform 106 can be modified to define an opening 103 for clearance of seat post 252 as seat 250 pivots up and down. In some embodiments, seat 250 includes side plates 256 (shown in FIG. 11). In some embodiments, a waist strap or seatbelt (not shown) can be used with seat 250 to retain the rider to the seat. Such an embodiment can be particularly useful for disabled riders. Although not shown in FIG. 16, front assembly 100 and rear assembly 200 can include calf strap 110, ankle strap 216, ankle cups 270, and other components discussed herein. Optional footholds 215 (shown in FIG. 18) can be attached to rearward portion 20 of board 10. Footholds 215 can be separate from rear assembly 200. In other embodiments, footholds 215 can be secured to base plate 232.

Figure 18:
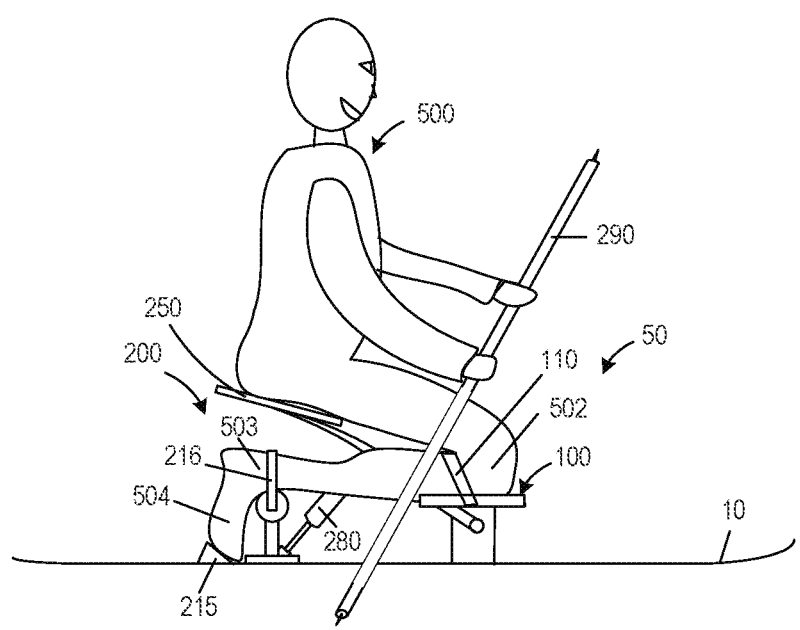
FIG. 18 illustrates a side view of a rider using a support assembly and pole, in accordance with an embodiment of the present disclosure.

FIG. 18 illustrates a side view of an example of a rider 500 using a support assembly 50 with board 10 and pole 290 in accordance with an embodiment of the present disclosure, where the rider is in a forward-facing, kneeling and seated position. Rider 500 has knees 502 on front assembly 100 and secured with calf strap 110 extending over the rider's calves. The rider's ankles 503 are supported by rear assembly 200 and secured with ankle strap 216. The rider's feet 504 are positioned against footholds 215. The rider 500 is seated on seat 250, which includes a shock absorber 280. The rider 500 uses pole 290 for balance and to assist in navigating terrain. When the support assembly 50 is installed across the midline 24 (shown in FIGS. 1-2) of board 10, the rider's center of gravity may be shifted behind, even with, or forward of midline 24 to transfer weight longitudinally along board 10. The rider can shift weight laterally, such as by leaning, to set board 10 on an edge 22a, 22b to initiate turns.

In use, the rider 500 places his knees 502 on the knee support 102 of front assembly 100 and rests his feet/ankles on the rear assembly 200, such as on horizontal support bar 214. After securing straps 110, 216 to hold the rider firmly to the board 10, the rider may shift between a low kneeling and/or seated position and a high kneeling position. In embodiments with the leg-support portion 128, the rider 500 can press forward against the leg-support portion 128, tilt to either side, or lean backward to maneuver the board 10. In embodiments equipped with seat 250, the rider 500 can ride in a seated position (shown, e.g., in FIG. 18) with the knees on front assembly 100. With seat 250, the rider 500 can transition between a seated position, a low kneeling position, and a high kneeling position as needed to traverse terrain and absorb bumps. Optionally, the user can employ pole 290 for improved balance and to facilitate turning by dragging or pushing pole 290 against the snow.

When riding a chairlift, for example, the rider can use toe opening 122 to attach board 10 to the rider's foot. For example, the rider completely un-clips from the support assembly 50 (which may include front assembly 100 and rear assembly 200), stands up, and slides the toe of one boot through the forward toe opening 122 on knee support 102. The toe clip 123 or toe opening 122 in front portion 120 will hold the rider's foot from moving forward or upward. Calf strap 110 can be fastened around the heel of the rider's boot to secure the boot to front assembly 100 (and therefore the board 10). With front assembly 100 holding the rider's foot forward in toe opening 122, the rider can ride a chairlift in the same manner as done with a traditional snowboard binding where the rider's front foot being secured to the snowboard by the front binding.

Figure 19:
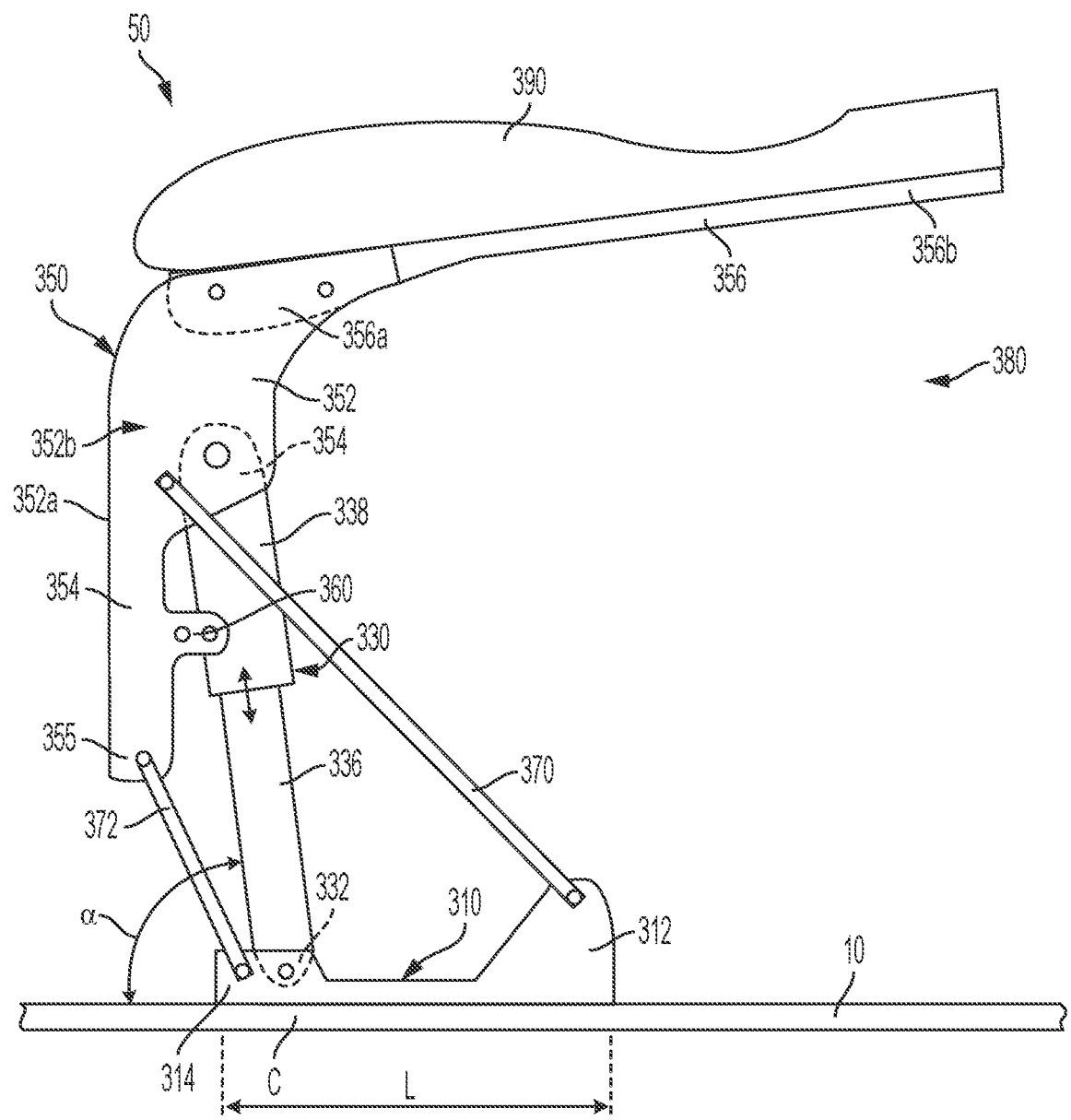
FIG. 19 illustrates a side view of a support assembly configured with suspension and assembly mounted to a snow sports board, in accordance with an embodiment of the present disclosure.

FIG. 19 illustrates a side view of a support assembly 50 that includes a suspension assembly 300, in accordance with an embodiment of the present disclosure. In some embodiments, the suspension assembly 300 includes a base 310 configured to be mounted to a snow sports board 10 (or simply "board"). In some embodiments, the base 310 has a length L comparable to that of a ski boot, snowboarding boot, or binding thereof. In some such embodiments, the base 310 is mounted over a center C of the snow sports board 10 so that the turning performance of the board 10 uses the same or similar portion of the board 10 and the weight of the rider is also generally centered over the board 10 during use. The base 310 includes a rear base portion 312 and a front base portion 314. As shown in FIG. 19, the rear base portion 312 and front base portion 314 can be connected or integrally made as a single component of the suspension assembly 300. In one example embodiment, the base 310 can be fastened to the board 10 using screws received in threaded holes in the board 10.

A shock absorber 330 has a lower end 332 attached to the front base portion 314. For example, the lower end 332 is bolted to the base 310 so that the shock absorber 330 can pivot about the bolt. An upper end 334 of the shock absorber 330 is pivotably attached to a frame 350. For example, the upper end 334 is bolted or otherwise secured to a body 352 of the frame 350. In some embodiments, the shock absorber 330 has a generally upright orientation, including defining an angle α with the board 10 with a range from 60-130°, including 80-100° and 70-110°, for example. In some embodiments, the shock absorber 330 is tilted forward at an angle from 60-90°, including 70-85° and 80-88°. The shock absorber 330 can be a pneumatic piston with a spring, a hydraulic piston with a spring, a spring shock absorber, or other shock absorber designed to absorb and damp shock impulses, such as bumps in the terrain or landing impact when riding the board 10. For example, the shock absorber 330 includes a piston 336 that is slidably received in a cylinder 338.

In accordance with one embodiment, the frame 350 includes a first portion 354 extending downwardly and a second portion 356 extending rearwardly from the first portion 354. In some embodiments, the frame 350 defines a body 352 between the first portion 354 and the second portion 356 of the frame 350. For example, the first portion 354, second portion 356, and body 352 generally define an inverted L shape, where the body 352 is located at a corner between the first and second portions 354, 356. The frame 350 can be connected to and supported at least in part by the shock absorber 330. In one embodiment, the body 352 is generally hollow and is attached to the upper end 334 of the shock absorber 330, which is received between lateral portions of the body 352. In one embodiment, the body 352 is made of metal and has a cross-sectional shape of a U, a rectangle, a circle or oval, a triangle, or other open or closed shape, as will be appreciated. In embodiments having a U-shaped cross-sectional shape, the body 352 may include a front panel 352a and opposed side panels 352b, where the upper end 334 of the shock absorber 330 is received between the opposed side panels 352b. The rear portion of the body 352 is open to permit the body 352 to pivot relative to the shock absorber 330.

In one embodiment, the first portion 354 of the frame 350 extends downwardly from the body 352 along the front and/or side portions. In some embodiments, the first portion 354 is continuous with and integral to the body 352. In other embodiments, the first portion 354 is a separate part that can be attached to the body 354. The first portion 354 can be configured with a mounting bracket 360 for a knee support platform, such as knee support 420. For example, the mounting bracket 360 is a tab or protrusion that extends generally horizontally and defines openings for fasteners. In some embodiments, the frame 350 includes two or more mounting brackets 360 along each side. The height of the knee support 420 above the board 10 and the vertical distance between the knee support 420 and the seat 390 can be modified by selecting the appropriate mounting location, as will be appreciated. Alternately, the frame may not specifically define mounting brackets 360, but instead defines mounting openings to define one or more locations to attach knee support 420. In one embodiment, the mounting bracket 360 permits adjustable tilt of the knee support 420. For example, a rearward end of plates 421 of the knee support 420 has an adjustable height above the board 10, thereby permitting the rider 500 to adjust the angle of the plate(s) 421 with respect to the board 10. In some such embodiments, the rider 500 may desire to release the rearward end of the plate(s) 421 for boarding a chairlift, such as by releasing a catch on the mounting bracket 360. When the rider 500 is ready to ride, the rearward end of the plate(s) 421 can then be raised and locked in place by re-engaging the catch on the mounting bracket 360. Numerous variations and embodiments will be apparent in light of the present disclosure.

The second portion 356 of the frame 350 defines a support or seat beam that extends along a bottom of a seat 390, in accordance with some embodiments. The second portion 356 has a forward end portion 356a and a rearward end portion 356b. For example, the second portion 356 is configured as a cantilever that extends rearwardly over the board 10 a distance of 16-20 inches, and provides cantilevered support to the seat 390. In some embodiments, the second portion 356 can be continuous with and integral to the body 352. In other embodiments, the second portion 356 of the frame 350 can be a separate component that is attached to the body. In one example embodiment, the forward end portion 356a of the second portion 356 of the frame 350 can be removably attached to the body 352 using bolts or other suitable fastener. In some embodiments, the second portion 356 of the frame 350 defines an open region 380 below the seat 390 that is configured and sized to receive the seat of a chairlift or equivalent.

In some example embodiments, the second portion 356 of the frame 350 is elevated above each knee plate 421 by about 6-9 inches, such as about 7.5 inches. In one such embodiment, the rearward end portion 356b of the second portion 356 of the frame 350 is about 16 inches or more above the ground to provide clearance to receive a chairlift seat 602 when no rider is on the assembly. The second portion 356 extends about 15 inches from the first portion 354 of the frame. For example, the open region 380 has a length from the rearward end portion 356b to the body 352 of the frame 350 of about 12 to 18 inches, including the subrange of 14-16 inches, about 15 inches, or other suitable length comparable to or appropriate for the size of a chairlift seat 602.

In some embodiments, the second portion 356 of the body 352 has a height above the board 10 sufficient to receive the chairlift seat 602 below it when the shock absorber is in an active-use state. For example, chairlift seats may be between 16 and 22 inches above the ground. Accordingly, in some embodiments, the bottom of the second portion 356 is at least that height above the ground when the suspension assembly 300 is mounted to a board 10. In other embodiments, the rearward end of the second portion of the frame is at least 16 inches above the board 10, such as from 16 to 22 inches above the board 10, including 16-18 inches, 16-20 inches, 18-20 inches, and 18-22 inches. When the rider is seated on the seat 390 in a resting or stationary position for the board 10, the shock absorber typically will compress to some extent, referred to as sag. Accordingly, in some embodiments, the rearward end portion 356b of the second portion 356 of the frame 350 is from 16 to 22 inches above the board 10, inclusive of sag in an amount up to 3 inches (e.g., 1-3 inches), up to 4 inches (e.g., 2-4 inches), or up to 5 inches (e.g., 2-5 inches) of sag when the rider is seated on the seat 390 and/or kneeling on the knee support 420. Numerous variations and embodiments will be apparent in light of the present disclosure.

A first linkage 370 connects the body 352 to the rear base portion 312. A second linkage 372 connects the bottom end 355 of the frame 350 to the front base portion 314. The first linkage 370 and second linkage 372 extend between the frame 350 and the base 310 to provide torsional stability and limit the range of motion of the seat 390 in response to compressing or extending the shock absorber 330. In one example, the first linkage 370 extends upward and forward at an angle of about 45° from the base 310 to the frame body 352 and attaches adjacent the upper end 334 of the shock absorber 330. The second linkage 372 extends upward and forward to the bottom end 355 of the frame 350 at an angle of about 60°. In one embodiment, each of the first linkage 370 and the second linkage 372 can include a pair of rods extending in parallel. For torsional stability, the rods can be connected along much of their lengths by a plate to approximately define an H shape. In other embodiments, the first linkage 370 and the second linkage 372 include a single rod that connects to the frame 350 and the base 310 at a single point or at two points using a yoke or forked end, for example. Numerous variations and embodiments will be apparent in light of the present disclosure.

Figure 20:
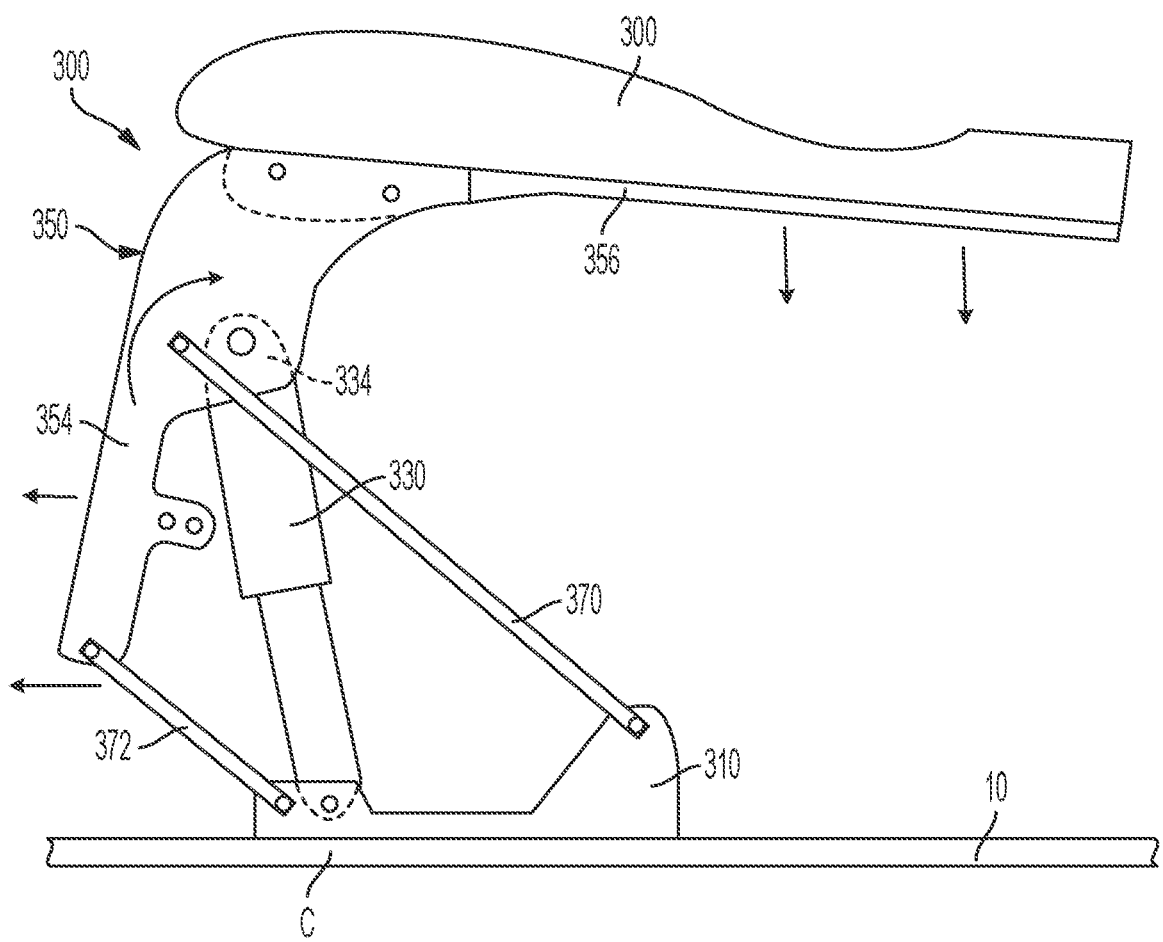
FIG. 20 illustrates a side view of the support assembly of FIG. 19 shown with the shock absorber compressed in response to a downward load applied to the seat, in accordance with an embodiment of the present disclosure.

FIG. 20 illustrates a side view of the suspension assembly 300 of FIG. 19, showing the shock absorber 330 in a compressed state as the result of a downward load applied to the seat 390. The first linkage 370 and second linkage 372 resist twisting and leaning of the suspension assembly 300 with respect to the base 310. The first and second linkages 370, 372 also substantially limit movement of the seat 390 to be forward-backwards or up-down along a vertical plane extending upward from the board 10 (rather than laterally or rotationally with respect to the board) when the shock absorber 330 is compressed or extended. That is, when a downward load is applied to the seat 390, the frame pivots about the upper end 334 of the shock absorber 330. The second linkage 372 limits upward movement of the first portion 354 of the frame 350 when the frame 350 pivots about the upper end 334 of the shock absorber 330 during compression of the shock absorber 330. As such, a downward force on the seat 390 compresses the shock absorber 330 with the second portion 356 of the body 352 acting as a lever handle. For example, a downward force on the seat 390, such as the rider's weight, compresses the shock absorber 330 and pivots the frame 350 downward and forward about the upper end 334 of the shock absorber 330 so that the downwardly-extending first portion 354 of the frame pivots forward. Since movement of the frame 350 is restricted by the first and second linkages 370, 372, the first portion 354 of the frame 350 tends to rotate forward when the shock absorber 330 is compressed downward along the axis of the shock absorber 330. For example, a downward force on the seat 390 causes the seat to translate downward along the path of the shock absorber 330 while also rotating about the connection at the upper end 334 of the shock absorber 330. Such action substantially maintains the weight of the rider over the center C of the board 10, in accordance with some embodiments.

The frame 350 and seat 390 can be constructed to have a narrow, moderate, or relatively wide size between the rider's knees. In a kneeling position on the knee support 420, a wider spacing between the knees provides a stable stance from which the rider can balance and control the board 10, as will be appreciated. When sitting on the seat 390, the rider may squeeze the frame 350 between the knees for control and stability. For example, the frame 350 has a lateral width (between side panels 352b or measured as seat width) from 4 to 16" or other suitable width. In some embodiments, the rider's knees 502 are spaced by the frame 350 and/or seat 390 having a lateral thickness of at least 4", including at least 6", at least 8", at least 10", at least 12", or at least 14". In other embodiments, the frame 350 and/or seat 390 has a lateral thickness between the rider's knees 502 from 4-12", 4-8", 6-10", 6-12", 8-12", or 8-16". Numerous variations and embodiments will be apparent in light of the present disclosure. The rider's feet 504 may be positioned close together, approximately defining a tripod stance with the knees 502, or spaced apart to define a four-point stance with the knees 302.

Figure 21:
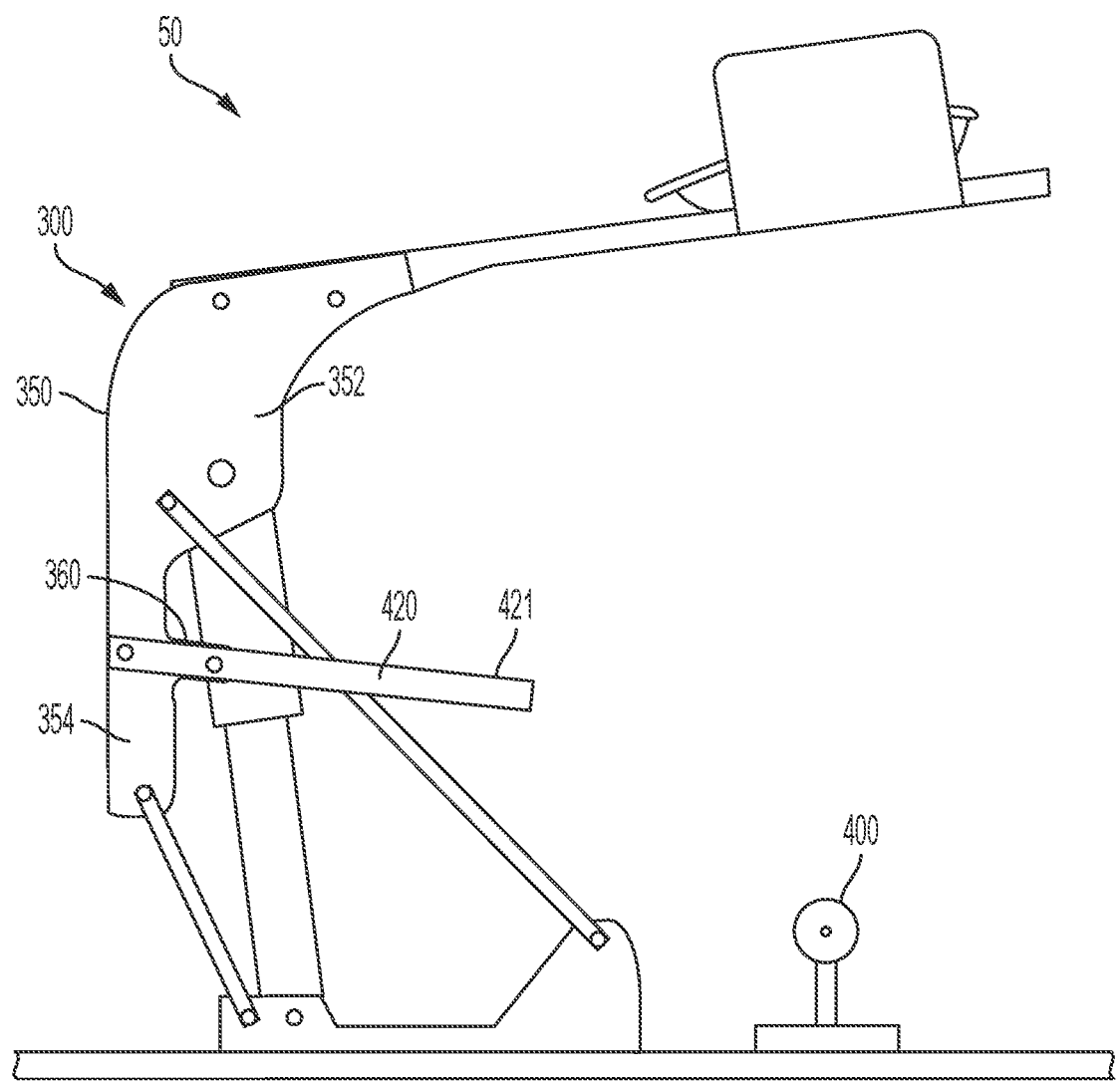
FIG. 21 illustrates a side view of a support assembly that includes a seat, a knee support, and a foot support, in accordance with an embodiment of the present disclosure.

Referring now to FIG. 21, a side view illustrates the support assembly 50 of FIG. 19 with the addition of a knee support 420 secured to the second portion 354 of the frame 350. In one embodiment, the knee support 420 includes left and right plates 421 that connect to the frame 350 using the mounting brackets 360. The plates of the knee support 420 can be sized to accommodate the rider's knee and/or shin, for example. In other embodiments, the knee support 420 is a peg or bar that extends laterally from the frame 350. In some such embodiments, the rider may use a shin guard 440 or other accessory to distribute the rider's weight on the relatively small area of the peg. In some embodiments, the knee support 420 has a fixed position and extends laterally from the frame 350. In other embodiments, the knee support 420 can be folded up along the side panels 352b of the body 350. Thus, when not in use, such as when the rider prepares to board a chairlift or when the support assembly 50 is being transported, the plates 421 can be folded up along the face of each side panel 352b. Embodiments of the suspension assembly 300 with the knee support 420 can include or omit the foot support 400.

The embodiment of FIG. 21 also includes an optional foot support 400. In some embodiments, the foot support 400 includes lateral bars that are configured to contact the top or front of the rider's ankles, such as when the rider's toes tuck behind the bars. In another embodiment, the foot support 400 can be configured to contact the soles of the rider's boots, such as at the toe region, middle region, or heel region. In some embodiments as shown, the foot support is separate from the suspension assembly 300.

Figure 22:
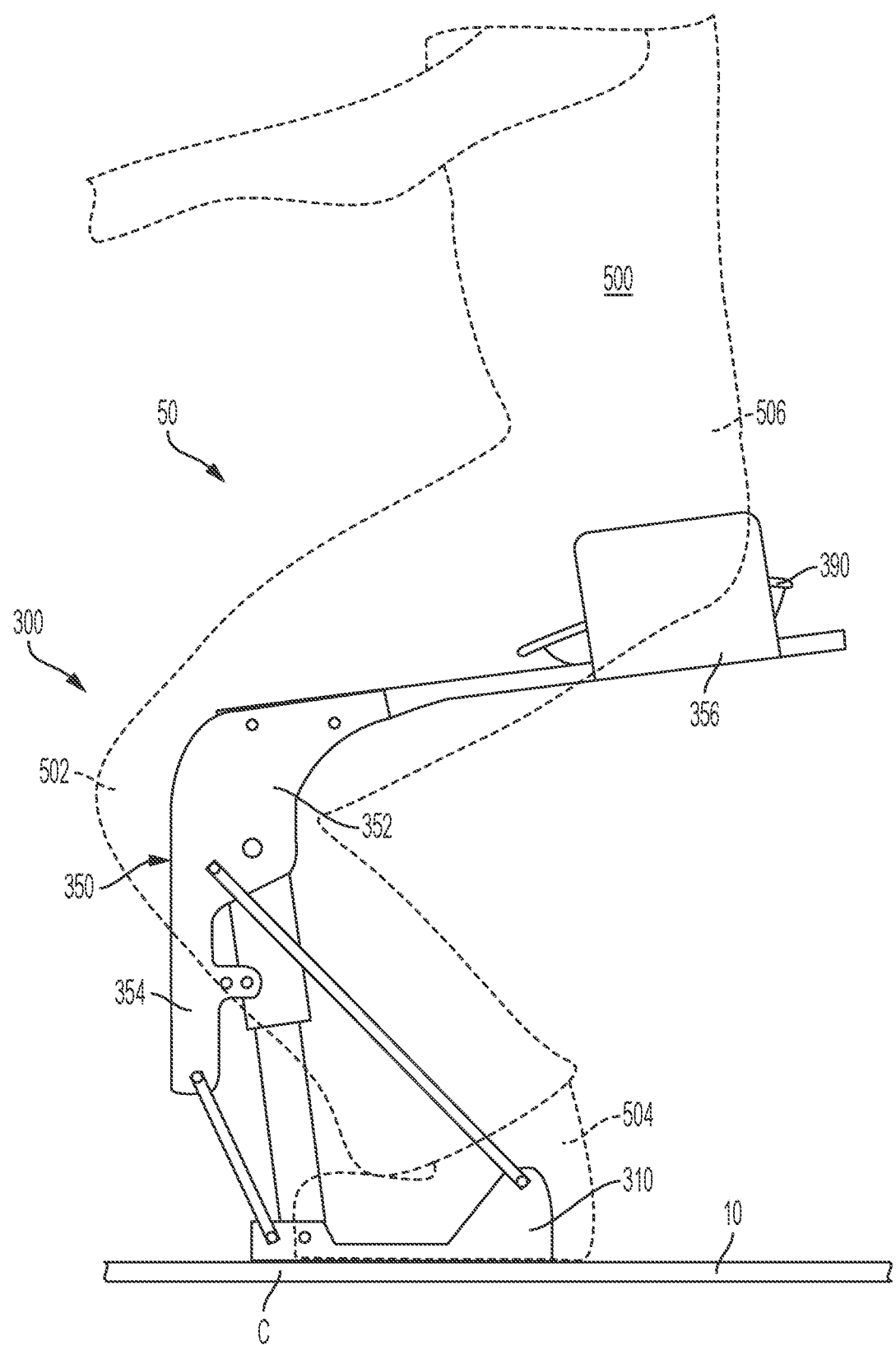
FIG. 22 illustrates a side view of a support assembly and rider to show an example active-use position with the rider's feet on the board, in accordance with an embodiment of the present disclosure.

FIG. 22 illustrates a side view showing an example riding position for the suspension assembly 300 of FIG. 19, in accordance with some embodiments. Here, the rider 500 is seated on the seat 390 with knees 502 bent and feet 504 on the board 10 alongside the base 310. Note that the rider's knees 502 are vertically below and forward of the rider's hips 506. In such a position, the rider 500 can squeeze the assembly 300 between the knees 502. In addition, the rider 500 can assume a standing position to raise off of the seat 390, such as in anticipation of a bump or jump. The rider can lean forward or backward to shift weight across the center C of the board 10 and also can lean to the side to transfer weight to an edge of the board 10 to initiate and make a turn. Note that the rider's knee 502 is positioned at or near the attachment point between the frame 350 and the shock absorber 330. As such, pivot of the frame 350 about the upper end 334 of the shock absorber 330 is consistent with bending at the knee 502. Note also that the back of the rider's knee 502 is positioned at or near where the second portion 356 attaches to the body 352 of the frame 350.

Figure 23A:
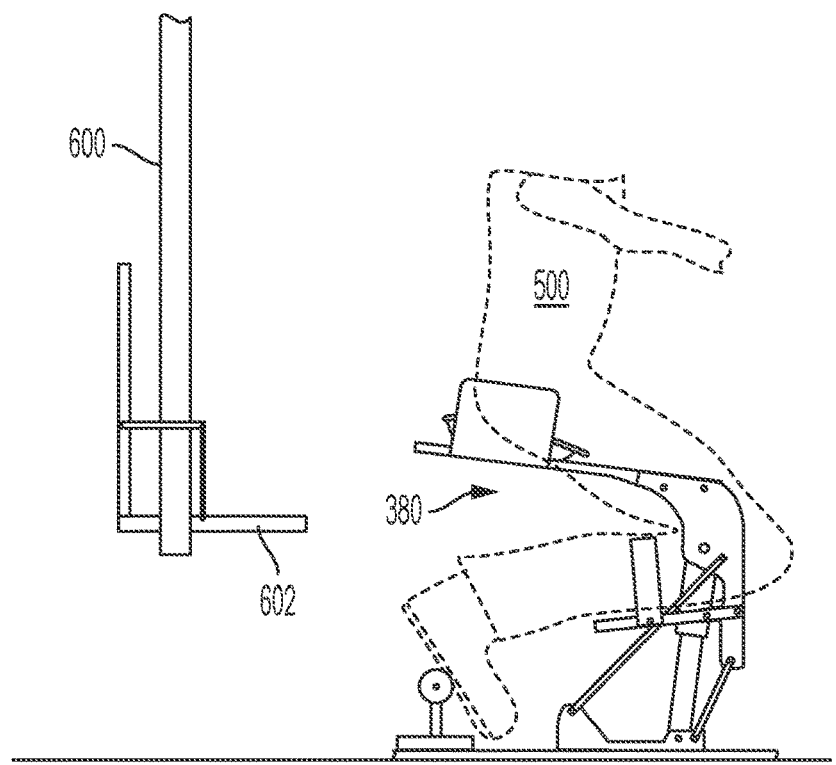
FIGS. 23A-23C illustrate side views showing example positions of a rider on the support assembly of FIG. 22 preparing to board, boarding, and after boarding a chairlift, respectively, in accordance with an embodiment of the present disclosure.
Figure 23B:
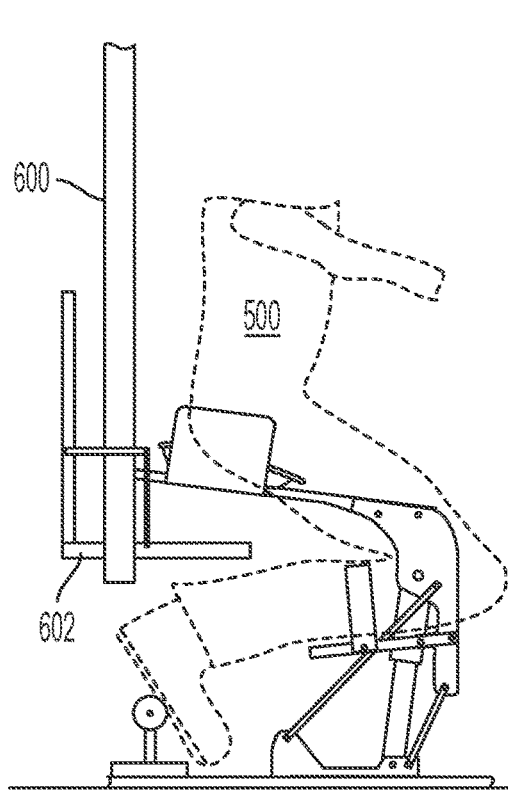
Figure 23C:
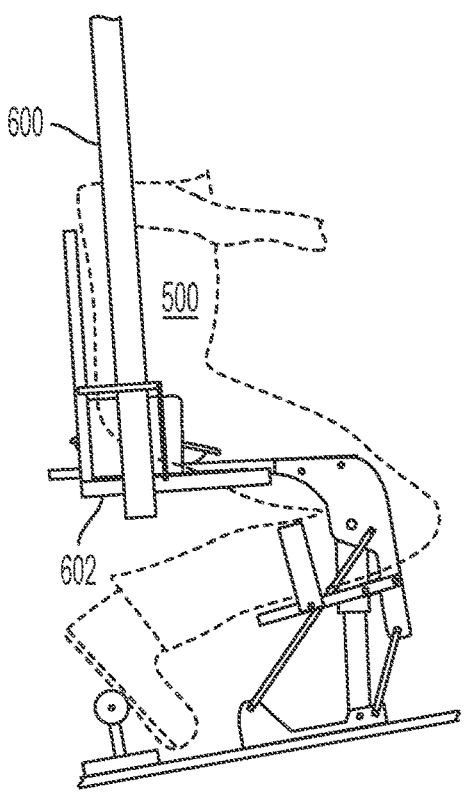

FIGS. 23A-23C show a sequence of a rider 500 boarding a chairlift 600 while using the support assembly 50 attached to a snow sports board 10, in accordance with an embodiment of the present disclosure. When boarding a chairlift, 600 for example, the chairlift seat 602 can be received in the open area 380 under the seat 390 and second portion 356 of the support assembly 50 while the support assembly 50 is in an active-use position, such as shown in FIG. 23A. As the chairlift seat 602 engages the support assembly 50, the rider 500 can remain seated or optionally may stand to provide clearance, such as shown in FIG. 23B. As the chairlift 600 lifts up to carry the rider 500 up the hill, the second portion 356 is retained on the chairlift seat 602 with the rider 500 seated on the seat 390, such as shown in FIG. 23C. The rearward end portion 356b of the second portion 356 can extend through the chair back as needed so that the rider 500 can sit on the seat 390 with the knees 502 bent at or near the edge of the chairlift seat as is done in skiing, for example. Optionally, a seatbelt or waist strap 432 (shown, e.g., in FIGS. 28 and 34) can be secured to the frame 350 and wrap around the rider's waist and hips 506, where the rider 500 remains in a seated position while boarding the chairlift 600.

Figure 24:
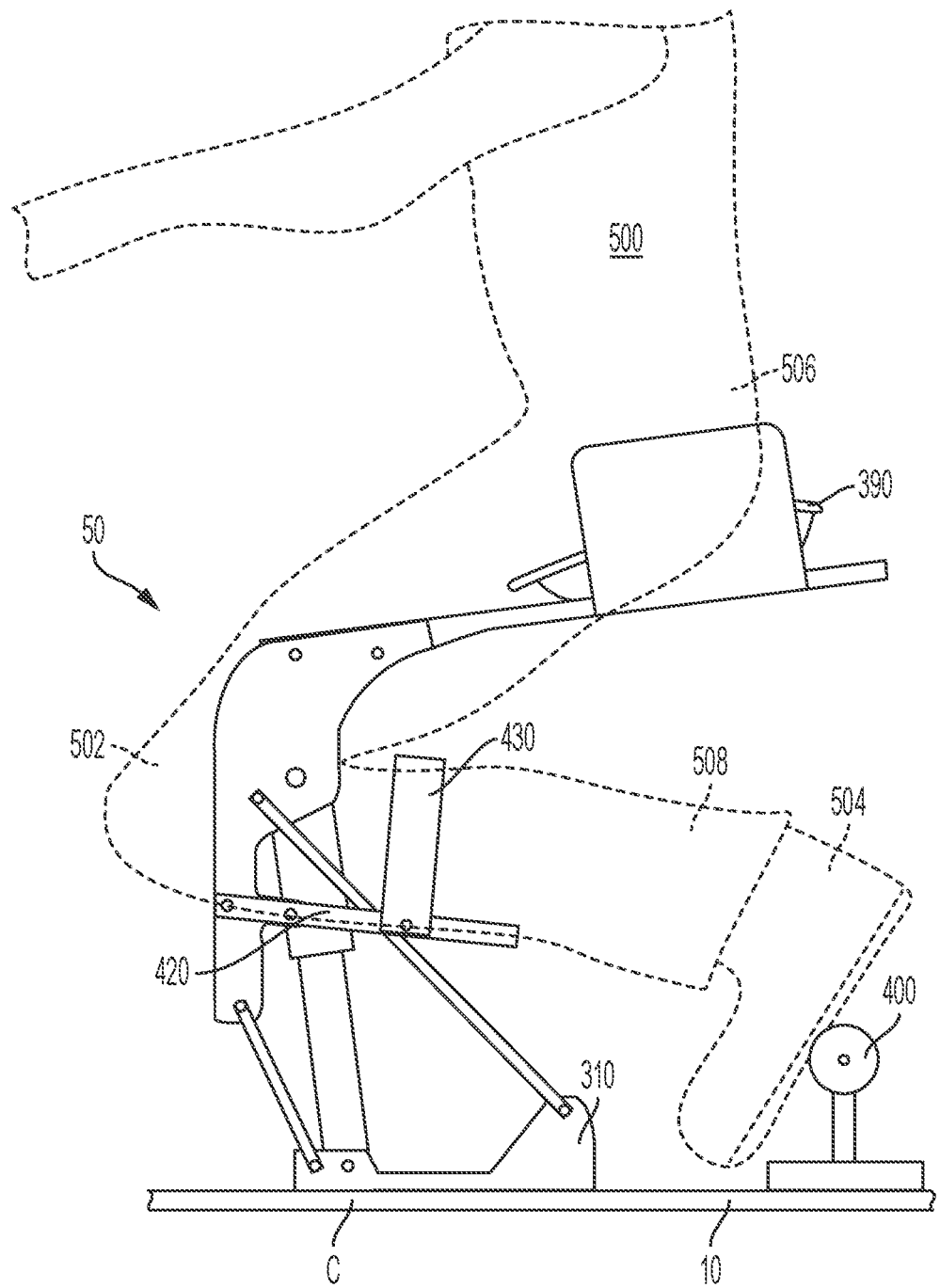
FIG. 24 illustrates a side view of a rider on a suspension assembly in an example active-use position with the rider seated, the rider's lower leg on a knee support platform, and the rider's feet engaging a foot support, in accordance with an embodiment of the present disclosure.

FIG. 24 illustrates a side view showing an example of an active-use position for the support assembly 50 configured with a suspension assembly 300 and knee supports 420, in accordance with an embodiment of the present disclosure. Here, the rider's knees 502 and part of the shins or lower legs 508 are on the knee support 420. The rider's feet 504 are elevated above the board 10 and contact the foot support 400. Similar to the position described with reference to FIG. 22, the rider's knees 502 are vertically below and forward of the rider's hips 506, enabling the rider 500 to more easily transfer weight to the board 10 for turning. The rider 500 can squeeze the frame 350 between the legs and knees 502, if needed or desired. Optionally, a leg strap 430 can be secured to the knee support 420 and wrap over the back of the rider's lower leg 508 to secure the rider 500 to the support assembly 50.

Figure 25:
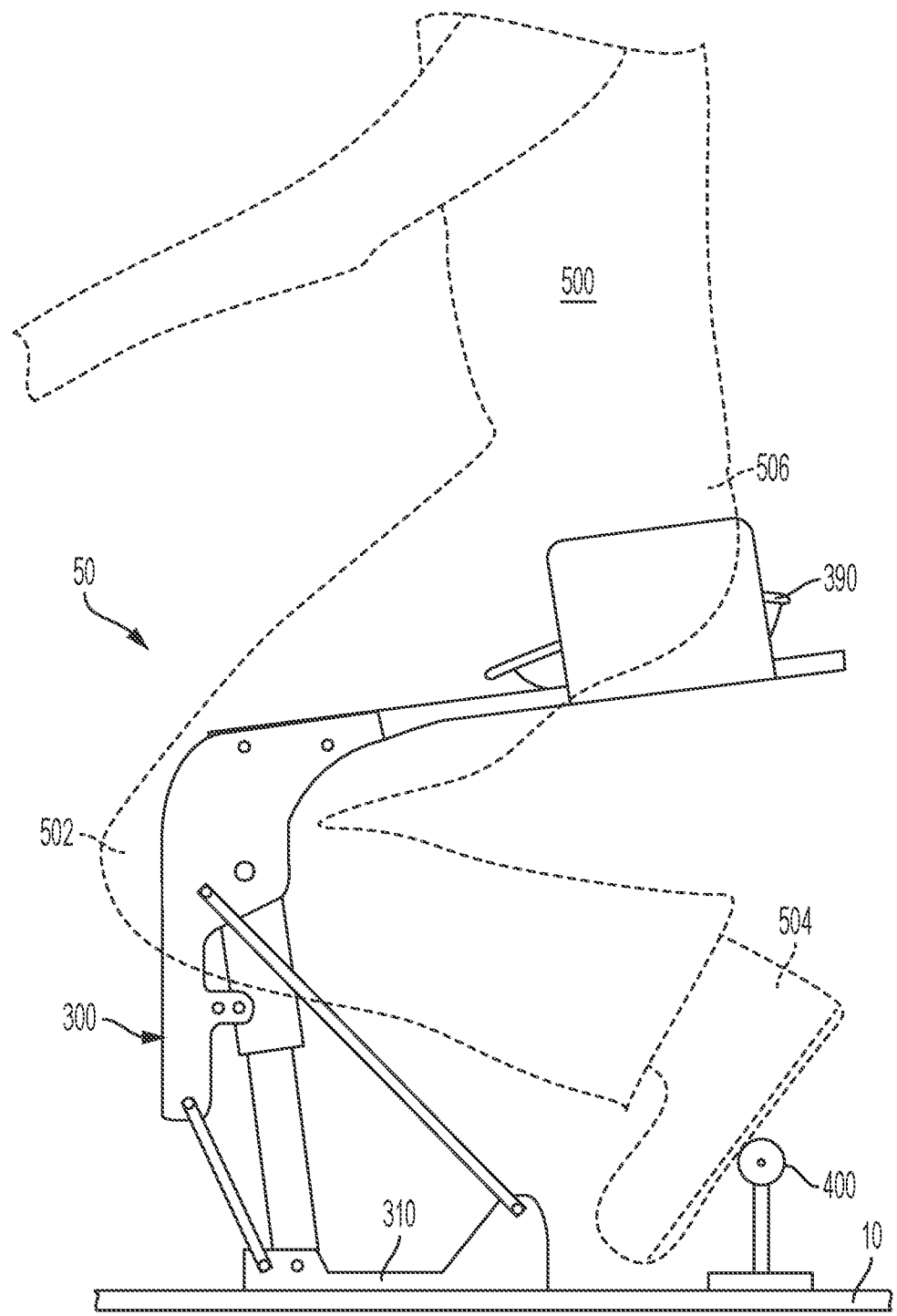
FIG. 25 illustrates a side view of a rider in an example active-use position on a support assembly in which the rider is seated and the rider's feet are on a foot support, in accordance with an embodiment of the present disclosure.

FIG. 25 illustrates a side view showing an example of an active-use position of a support assembly 50 configured with a suspension assembly 300 and foot support 400, in accordance with an embodiment of the present disclosure. Here, the suspension assembly 300 does not include the knee support 420 and the rider 500 may move the feet 504 between the board 10 and the foot support 400 as needed for comfort and/or control of the board 10. For example, the rider 500 can move the feet 504 to be alongside the base 310 in a sitting position or to assume a standing or squatting position. The rider 500 may also move the feet 504 to the foot support 400, such as to lean forward or as a general riding position. As with other embodiments, the rider 500 can use the legs to lift above the seat 390, such as to absorb bumps.

Figure 26:
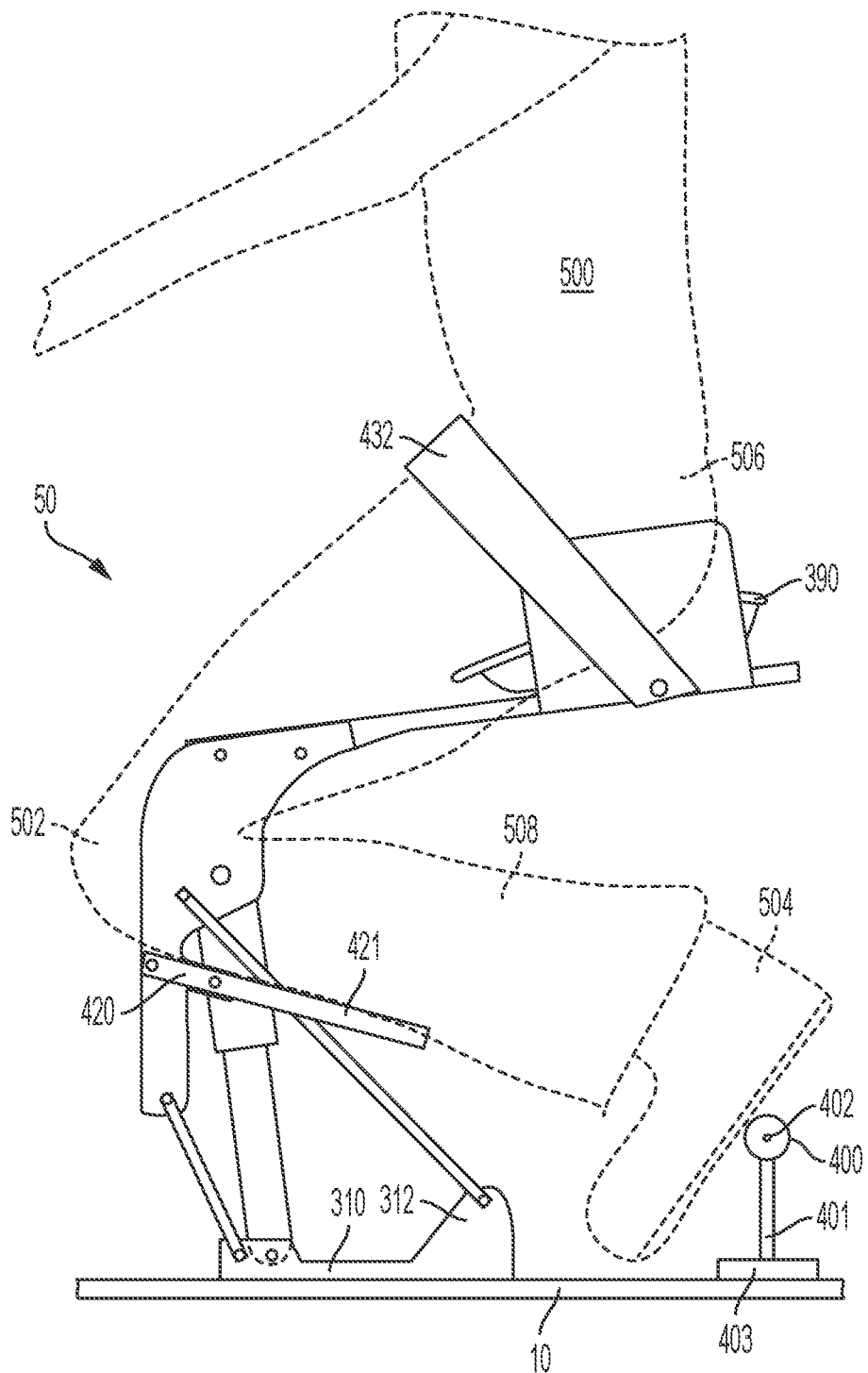
FIG. 26 illustrates a side view of a rider in an example active-use position on a suspension assembly with the rider's knees and shins on a knee support platform and feet in contact with a foot support, in accordance with an embodiment of the present disclosure.

FIG. 26 illustrates a side view showing an example active-use position for a support assembly 50 configured with a suspension assembly 300, foot support 400, and knee support 420, in accordance with an embodiment of the present disclosure. Here, the rider 500 has knees 502 and lower legs 508 supported by the knee support 420, which is shown as a pair of plates 421 in this example embodiment. Note that the plates 421 extend in an upward direction and the seat 390 extends downward forward the front of the board 10, consistent with the rider's shape.

The rider's feet 504 engage the foot support 400, which is mounted to the board 10 behind the base 310 in this example. For example, the post 401 is retained on the board by a base plate 403 or the like. In other embodiments, the foot support 400 may be attached to or be part of the rear base portion 312 or other portion of the base 310. The rider 500 can remain in a seated position (with optional waist strap 432 in some instances), can assume either a high kneeling position on the knee supports 420, or can assume a temporary squat/standing position using the foot support 400, in accordance with some embodiments. Here, the foot support 400 includes an upright post 401 and cross piece 402 that defines left and right foot positions.

Figure 27:
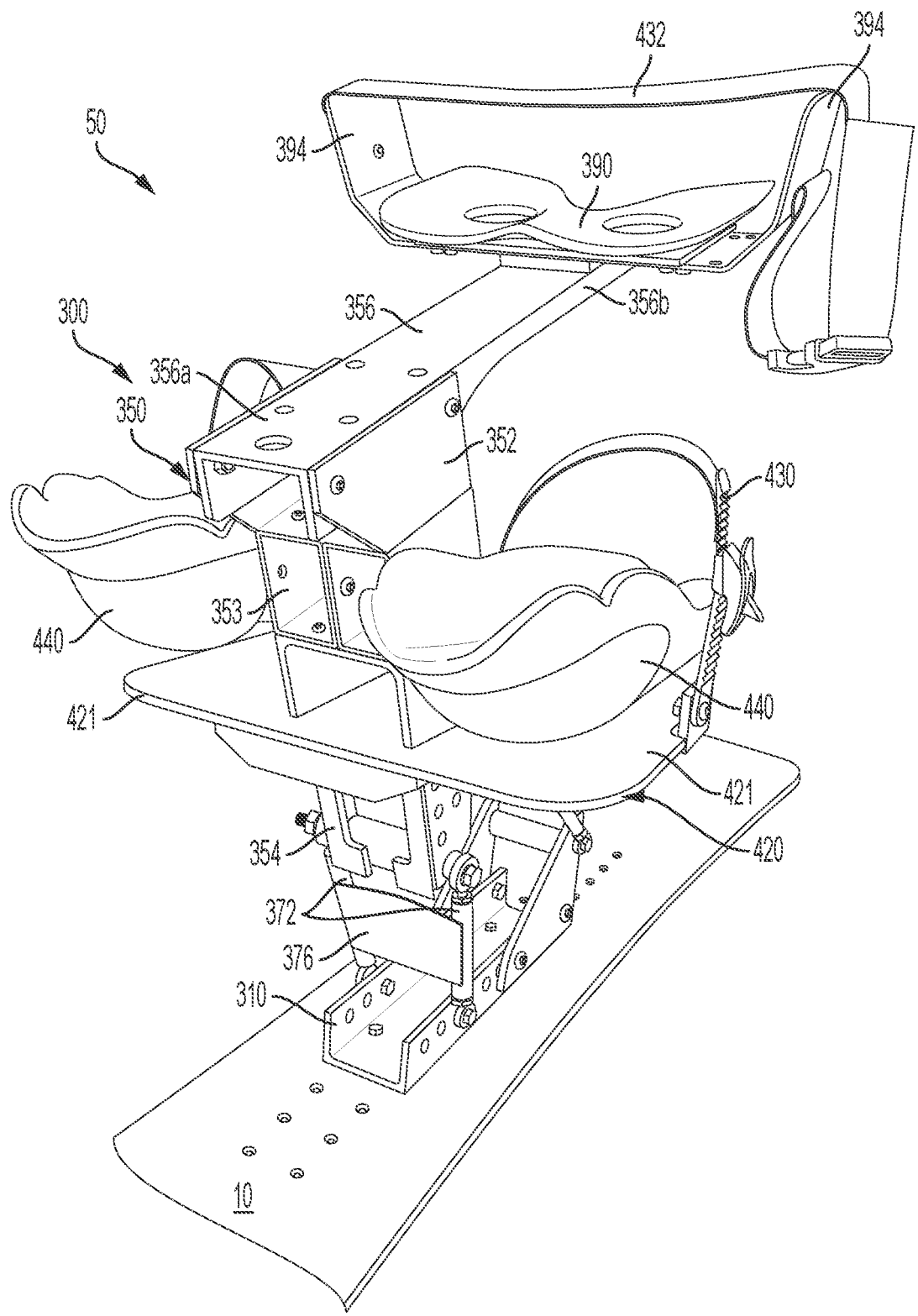
FIG. 27 illustrates a perspective view showing the front and left side of a support assembly and suspension assembly that includes a seat with hip plates and knee support platform with contoured knee pads, in accordance with an embodiment of the present disclosure.
Figure 28:
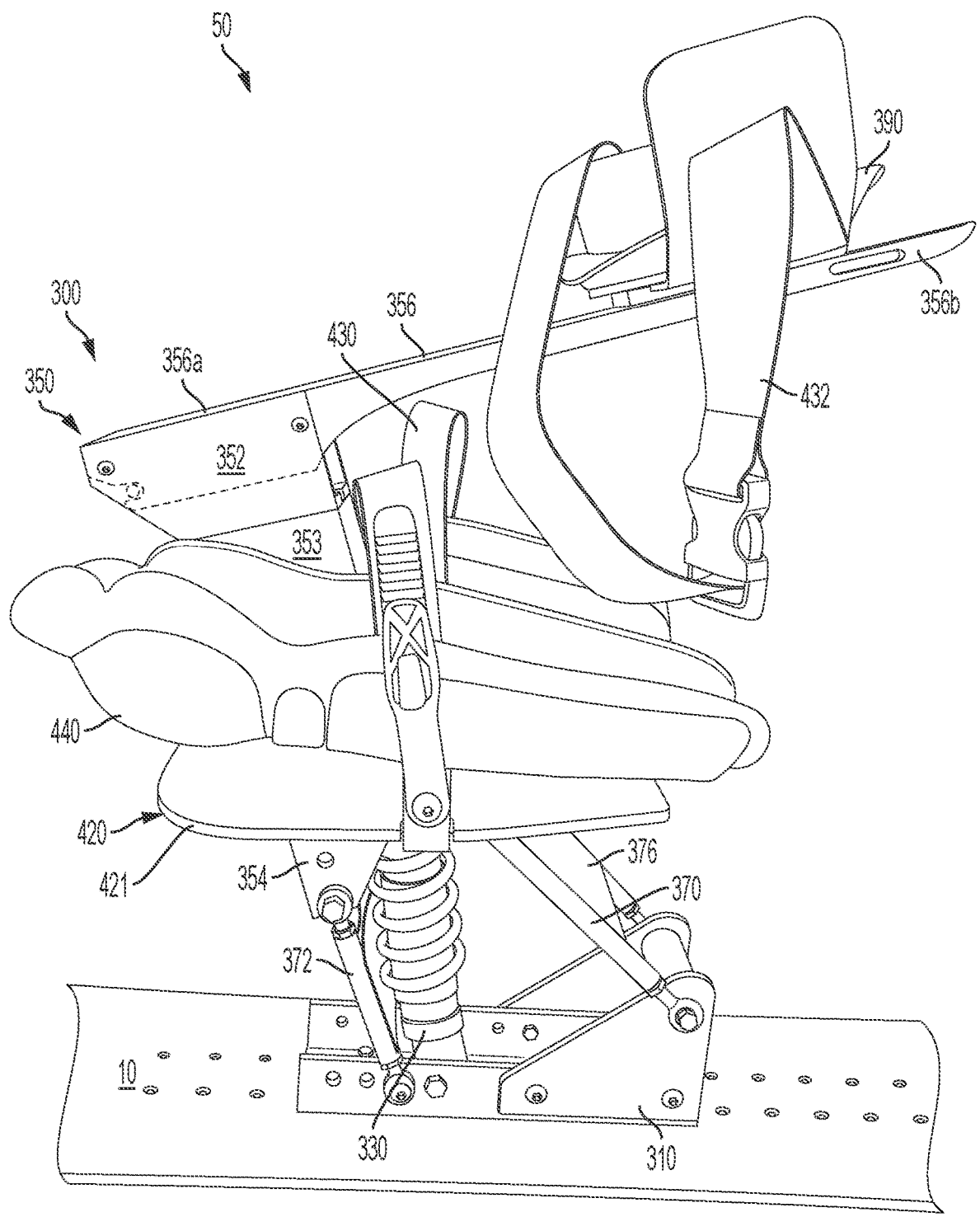
FIG. 28 illustrates a side view of the support assembly of FIG. 27 and shows components of the suspension assembly, in accordance with an embodiment of the present disclosure.

FIGS. 27 and 28 illustrate a front perspective view and a side view, respectively, of a support assembly 50 configured with a suspension assembly 300, seat 390, and knee support 302, in accordance with an embodiment of the present disclosure. The seat 390 is attached to the top of the rearward end portion 356b of the second portion 356 of the frame 350. An optional waist strap 432 is attached to hip plates 394, which extend upward from opposite lateral sides of the seat 390. Optionally, the waist strap 232 can attach to the second portion 356 of the frame 350. In this example embodiment, the second portion 356 and body 352 of the frame 350 are constructed from a U-channel member of aluminum or steel, for example. The forward end portion 356a of the second portion 356 of the frame 350 is received in a channel defined in the body 352. Using suitable fasteners, the second portion 356 can be removed and installed as needed. For example, pins with spring ball plungers can be used for quick removal and installation of the second portion 356, as will be appreciated. The body 352 is elevated above the first portion 354 by a riser 353. In some embodiments, the riser 353 is an optional attachment to the frame 350 that can be used to change the vertical distance between the knee support 420 and the seat 390 as desired for a particular rider 500. In some embodiments, the riser 353 is omitted and the body 353 is formed as one piece with the first portion 354 of the frame 350. In yet other embodiments, risers 353 can be configured with various dimensions to accommodate a customized seat height. The knee support 420 is configured as a pair of plates 421 with upwardly extending sides 422 to assist in preventing the rider's knee 502 from sliding laterally off the knee support 420.

The knee support 420 includes a pair of support plates 421, each mounted on opposite sides of the frame 350 and including a leg strap 430, which can be connected together to secure the rider to the suspension assembly 300. In some embodiments, the knee support 420 can be shaped to mate with the contour of the rider's lower leg 508. In one such embodiment, the knee support 420 includes shin guards 440 as a separate component worn by the rider 500. In another such embodiment, the shin guards 440 or the like are secured to the support plates 421. The first and second linkages 370, 372 include parallel rods 374 connected by a plate 376 fixedly attached to the rods 374, such as by welding. The shock absorber 330 is connected to the base 310 using a bolt through the lower end 332 of the shock absorber 330. Numerous variations and embodiments will be apparent in light of the present disclosure.

Figure 29:
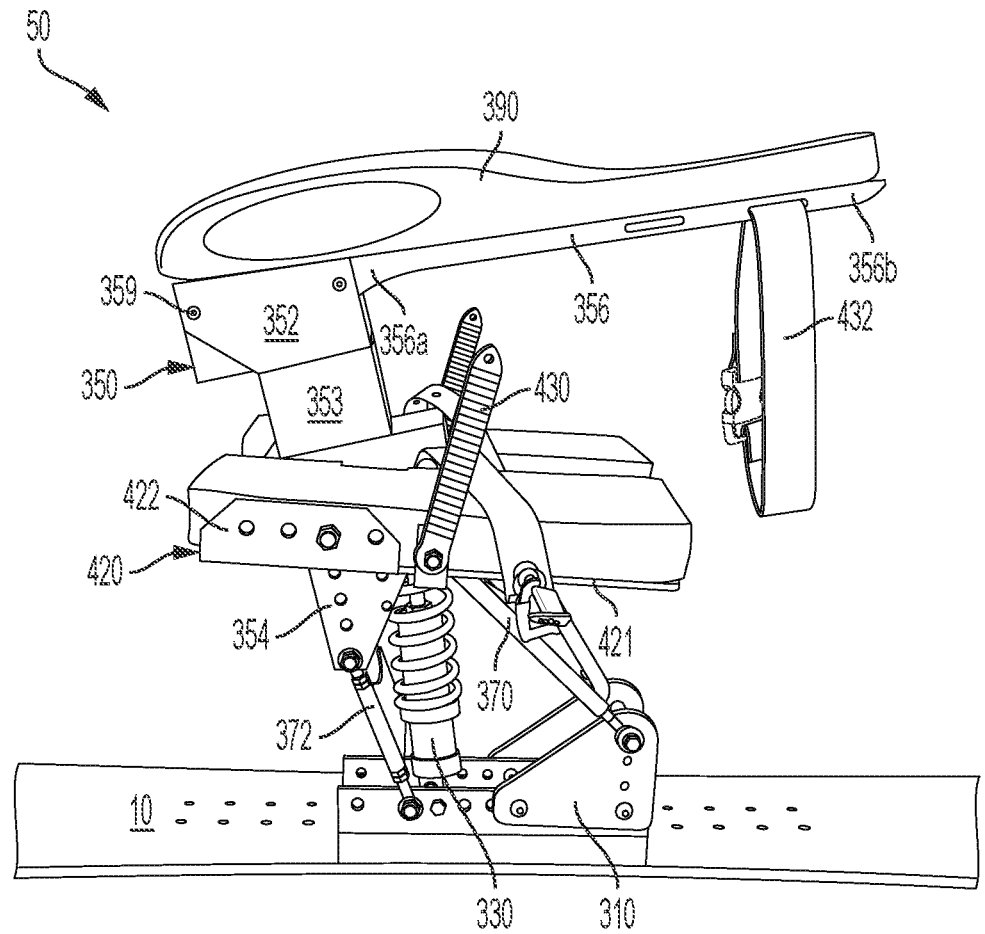
FIG. 29 illustrates a side view of a combined support and suspension assembly mounted on a snow sports board and including a padded knee support, in accordance with an embodiment of the present disclosure.

FIG. 29 illustrates a side view of a support assembly 50 with suspension assembly 300 and knee support 420, in accordance with another embodiment of the present disclosure. In this example, each plate 421 of the knee support 420 includes a pad 423 for the rider's comfort. The pad 423 is retained in part on the plate 421 by sides 422 that extend upward from the plate 421. The pad 423 can be made of foam rubber or other suitable material, as will be appreciated. A riser block 353 is secured between the upper end of the second portion 354 and the body 352 of the frame 350. The forward end portion 356a is slidably received in a U-shaped channel defined by the body 352 and secured therein using fasteners 359. As noted above, the second portion 356 can be configured for rapid removal from and installation on the frame 350, as will be appreciated. A waist strap 432 is secured to the second portion 356 of the frame 350 and a seat 390 is attached on top of the second portion 356.

Figure 30:
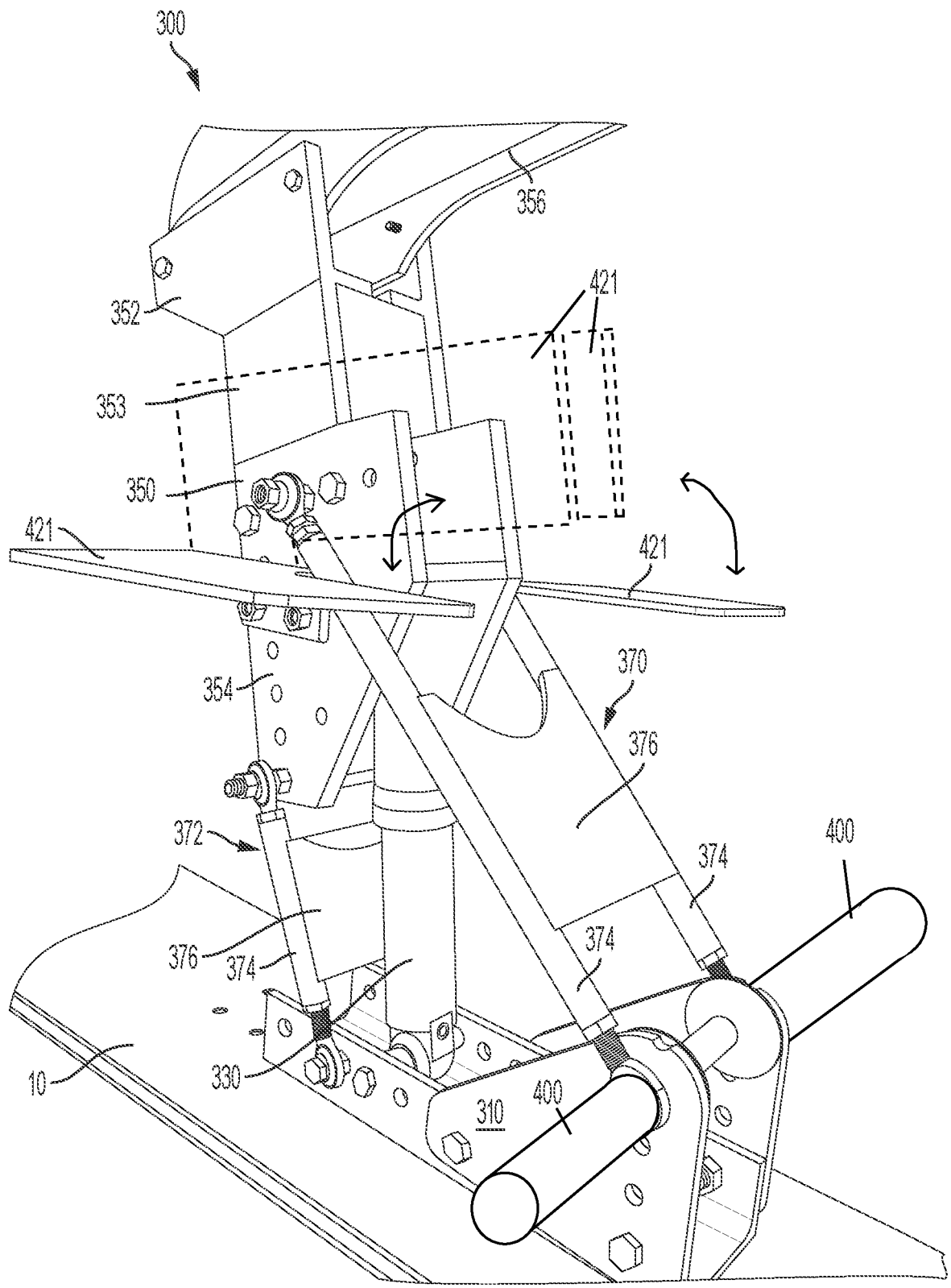
FIG. 30 illustrates a rear perspective view showing components of a suspension assembly, in accordance with an embodiment of the present disclosure.

FIG. 30 illustrates a rear perspective view of a suspension assembly 300 attached to a board 10, in accordance with an embodiment of the present disclosure. The suspension assembly 300 includes a shock absorber 330 connected between the base 310 and the frame 350. The first linkage 370 includes rods 374 that extend between the rear base portion 312 and the frame 350. A plate 376 connects the rods 374 to reduce or prevent both twisting of the frame 350 and movement of the assembly towards the sides of the board 10. The second linkage 372 is similarly constructed and connects between the front base portion 314 and the first portion 354 of the frame 350. Plates 421 are connected to opposite sides of the frame 350, providing a support platform for each of the rider's knees 502 and lower legs 508.

Figure 31:
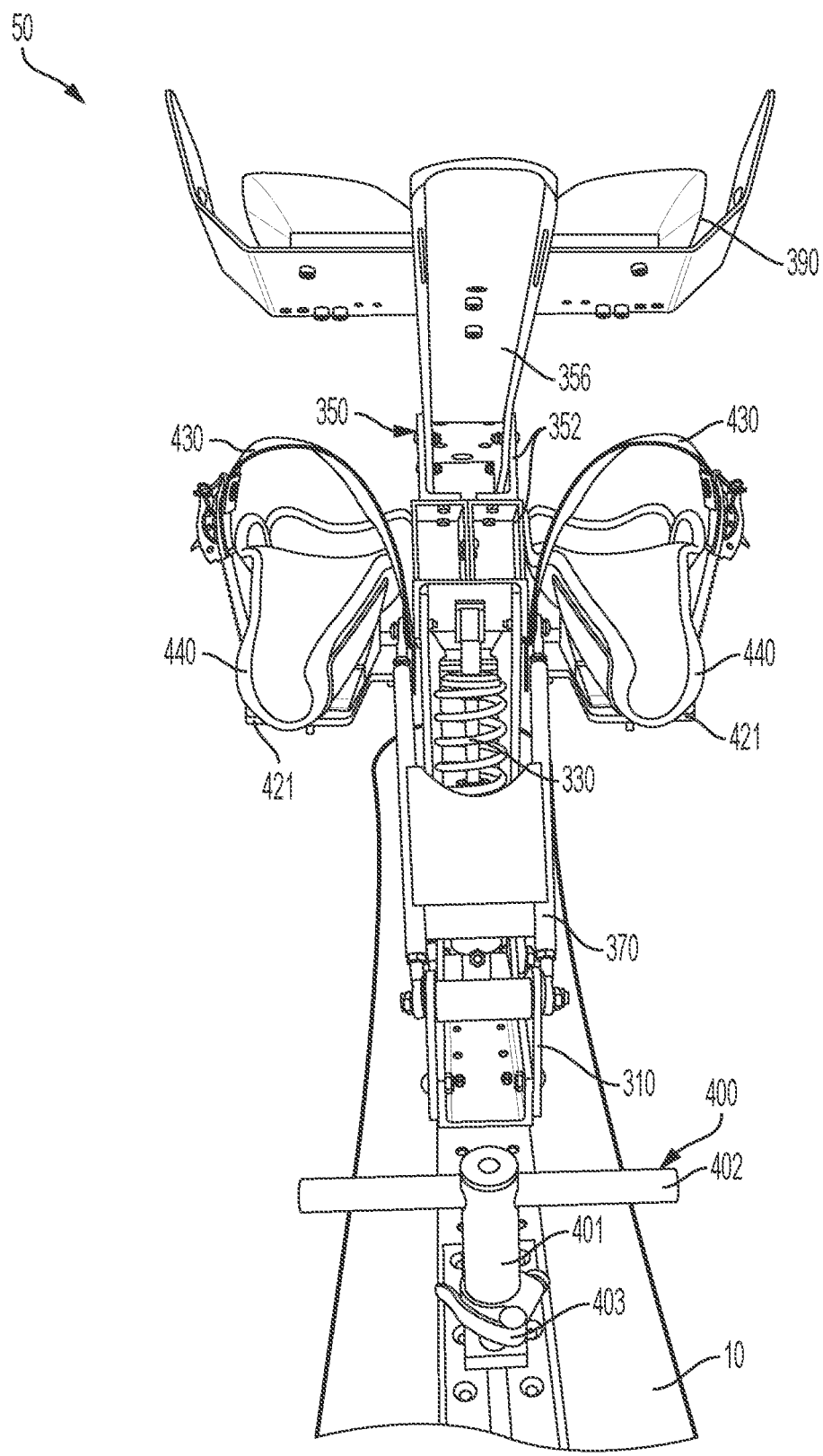
FIG. 31 illustrates a rear view of a support assembly that includes a suspension assembly, seat with hip plates, foot support, and knee support platform with shin guards, in accordance with an embodiment of the present disclosure.

FIG. 31 illustrates a rear view of a support assembly 50 configured with a suspension assembly 300, seat 390, and knee support 440, in accordance with an embodiment of the present disclosure. In this example, each plate 421 includes a shin guard 440 that is shaped to conform to the rider's lower leg 508. The shin guard 440 is secured to the plate 421 in some embodiments. As can be seen in FIG. 31, the width of the seat 590 and the knee support 420 extends laterally beyond the board 10. When using the optional foot support 400, the rider 500 can achieve a tripod-like stance with the knees 502 extending over the sides of the board 10 and the feet 504 engaging the foot support 400, which is secured along the center of the board 10. The rider 500 can use these features for balance and to transfer weight to edges of the board 10 for turning.

Figure 32:
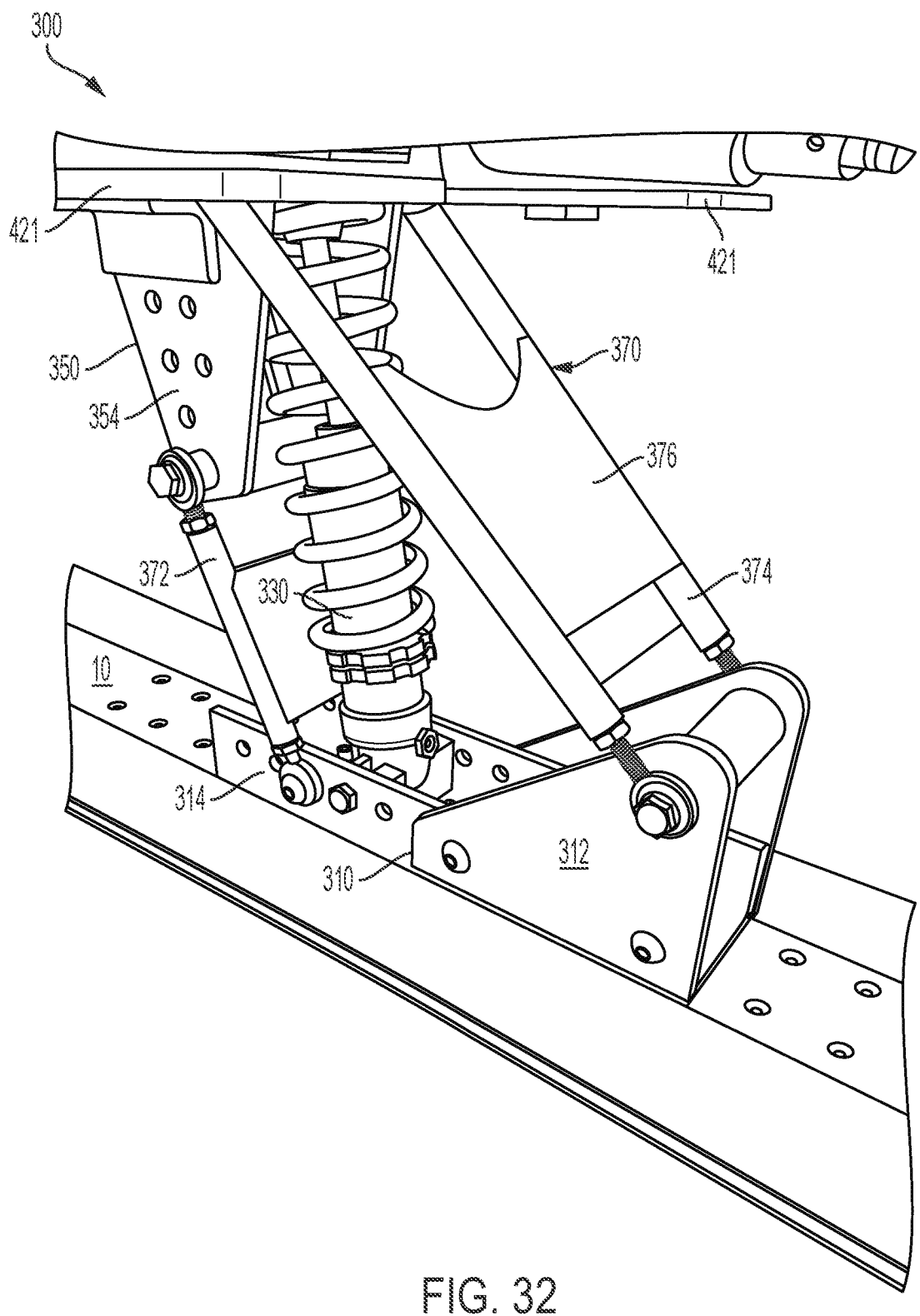
FIG. 32 illustrates a rear perspective view showing the base and shock absorber, in accordance with an embodiment of the present disclosure.

FIG. 32 illustrates a rear perspective view of suspension assembly 300 showing the base 310, shock absorber 330, first and second linkages 370, 372, and part of first portion 354 of frame 350, in accordance with an embodiment of the present disclosure.

In use, a support assembly 50 as variously described herein can provide a way to traverse packed or loose snow in a way that is different from both skiing and snowboarding. In accordance with some embodiments, the support assembly 50 provides a seat 390 with hip plates 394 or other barrier the rider 500 can use to transfer weight to the board 10. For example, when the rider 500 leans the torso to one side of the board 10, the rider 500 leans against the hip plates 394 and/or a waist strap 432, thereby transferring weight to the edge of the board 10 for turning. In accordance with some embodiments, a knee support 420 can be shaped to restrain the rider's lower leg 508 from sliding off of the plate 421. For example, the knee support 420 includes shin guards 440, a plate 421 with a concave shape, a knee plate 421 with sides 422, or a combination of such features. By engaging one or more of these features with the rider's lower leg 508, the rider 500 can efficiently shift weight to the board 10 for turning and control, for example. The combination of a seat 390 with hip plates 394 and a contoured knee support 420 can eliminate the need to secure the rider's ankles/feet 504 and lower leg 508, in accordance with some embodiments. Instead the rider 500 can use only a waist strap 432 to secure the rider 500 to the support assembly 50. Numerous variations and embodiments will be apparent in light of the present disclosure.

FURTHER EXAMPLE EMBODIMENTS

Example 1 is a support assembly for use with a snow sports board, the support assembly comprising: a front assembly configured to be attached to a forward portion of a snow sports board, the front assembly comprising a riser and a knee platform attached to the riser and constructed to receive a rider's knees thereon; and a rear assembly configured to be attached to a rearward portion of the snow sports board and configured to support a rider's feet or ankles; wherein when attached to the snow sports board, the support assembly supports a rider in a face-forward position with knees on the knee platform and feet or ankles supported by the rear assembly.

Example 2 includes the subject matter of Example 1, wherein the rear assembly comprises a base plate attachable to the snow sports board; a riser tube extending up from the base plate; and a seat connected to the riser tube and configured to support the rider in a seated position.

Example 3 includes the subject matter of Example 2, wherein the seat comprises a seat post; and a seat platform attached to an end portion of the seat post; wherein the seat post is telescopically receivable in the riser tube.

Example 4 includes the subject matter of Example 3, wherein the seat further comprises side plates extending upward from opposite sides of the seat platform.

Example 5 includes the subject matter of Example 2, wherein the rear assembly further comprises a stay connected between the base plate and the riser tube, wherein the base plate, the riser tube, and the stay substantially define a triangle.

Example 6 includes the subject matter of Example 2 and further comprises a horizontal support bar attached to the rear assembly and spaced above the base plate, wherein the horizontal support bar extends laterally across the snow sports board to support the rider's ankles when the rear assembly is attached to the rearward portion of the snow sports board.

Example 7 includes the subject matter of Example 6, wherein the horizontal support bar is secured to the stay.

Example 8 includes the subject matter of Example 2, wherein the rear assembly includes a foothold securable to the rearward portion of the snows sports board and configured to engage the rider's feet.

Example 9 includes the subject matter of Example 8, wherein the foothold is attached to the base plate.

Example 10 includes the subject matter of Example 8, wherein the foothold is separate from the base plate and the foothold is configured for attachment to the rearward portion of the snow sports board behind the base.

Example 11 includes the subject matter of any of Examples 1-10 and further comprises a flexible strap secured to sides of the knee platform and having a length sufficient to be secured over the rider's lower leg to retain the rider on the knee platform.

Example 12 includes the subject matter of Example 11, wherein the flexible strap has a first end portion secured to a first side portion of the knee platform and a second end portion secured to a second side portion of the knee platform.

Example 13 includes the subject matter of Example 11, wherein the flexible strap includes a releasable strap connector.

Example 14 includes the subject matter of any of Examples 1-10 and further comprises an ankle strap secured to the rear assembly and configured to fasten over the rider's ankles.

Example 15 includes the subject matter of Example 1-10, wherein the front assembly further comprises a leg-support portion extending upward from the knee platform.

Example 16 includes the subject matter of Example 15, wherein the leg-support portion is constructed to contact a front of the rider's thighs when the rider is kneeling on the knee platform.

Example 17 includes the subject matter of Example 15, wherein the leg-support portion is pivotably attached to the knee platform and movable between (i) an upright position in which the leg-support portion extends generally perpendicular to the knee platform and (ii) a folded position in which the leg support portion extends rearwardly at least in part and defines an angle of less than 90° with the knee platform.

Example 18 includes the subject matter of any of Examples 1-10, wherein the knee platform includes sidewalls on opposite lateral sides of the knee platform and extending upward therefrom.

Example 19 includes the subject matter of Example 18, further comprising a knee pad on the knee platform.

Example 20 includes the subject matter of Example 6 or 7, wherein the horizontal support bar is padded.

Example 21 includes the subject matter of any of Examples 2-10 and further comprises a shock absorber connected to the seat.

Example 22 includes the subject matter of any of Examples 1-10, wherein the riser of the front assembly comprises at least one shock absorber.

Example 23 is a support assembly for use with a snow sports board, the support assembly comprising a front assembly configured to be attached to a forward portion of a snow sports board and a rear assembly configured to be attached to a rearward portion of the snow sports board. The front assembly includes a riser and a knee platform attached to the riser and constructed to receive a rider's knees thereon. The rear assembly includes a base extending up from the rearward portion when the rear assembly is attached to the snow sports board. A seat is attached to the support assembly and configured to support the rider in a seated position, wherein when attached to the snow sports board, the support assembly is configured to support a rider in a face-forward position with the rider's knees on the knee platform and feet extending rearward adjacent the rear assembly.

Example 24 includes the subject matter of Example 23, wherein the base comprises a base plate attachable to the snow sports board and a riser tube extending up from the base plate, wherein the seat is connected to the riser tube and configured to support the rider in a seated position.

Example 25 includes the subject matter of Example 24, wherein the seat comprises a seat post and a seat platform attached to an end portion of the seat post, wherein the seat post is telescopically receivable in the riser tube.

Example 26 includes the subject matter of any of Examples 23-25 and further comprises a shock absorber connected between the seat and the base.

Example 27 includes the subject matter of Example 26, wherein the shock absorber is connected between the seat and the base plate.

Example 28 includes the subject matter of Example 27, wherein the shock absorber is connected to the seat post.

Example 29 includes the subject matter of Example 24, wherein the riser tube includes a shock absorber.

Example 30 includes the subject matter of any of Examples 23-29, wherein the seat includes side plates extending upward from opposite lateral sides of the seat.

Example 31 includes the subject matter of Example 24, wherein the base further comprises a stay connected between the base plate and the riser tube, wherein the base plate, the riser tube, and the stay define a triangle.

Example 32 includes the subject matter of any of Examples 23-29 or 31 and further comprises a horizontal support bar attached to the base and spaced above the base plate, wherein the horizontal support bar extends laterally across the snow sports board to support the rider's ankles when the rear assembly is attached to the rearward portion.

Example 33 includes the subject matter of Example 32, wherein the horizontal support bar is secured to the stay.

Example 34 includes the subject matter of any of Examples 23-29, wherein the rear assembly includes a foothold securable to the rearward portion of the snows sports board and configured to engage the rider's feet.

Example 35 includes the subject matter of Example 32 and further comprises a foothold attached to the base plate, the foothold configured to engage the rider's feet.

Example 36 includes the subject matter of Example 34, wherein the foothold is separate from the base plate and is configured for attachment to the rearward portion of the snow sports board behind the base.

Example 37 includes the subject matter of any of Examples 23-29 and further comprises a flexible strap secured to sides of the knee platform, where the strap is configured to be secured over the rider's leg to retain the rider on the knee platform.

Example 38 includes the subject matter of Example 37, wherein the flexible strap has a first end portion secured to a first side portion of the knee platform and a second end portion secured to a second side portion of the knee platform.

Example 39 includes the subject matter of Example 37, wherein the flexible strap includes a releasable strap connector.

Example 40 includes the subject matter of any of Examples 23-29 and further comprises an ankle strap secured to the rear assembly and configured to fasten over the rider's ankles.

Example 41 includes the subject matter of any of Examples 23-29, wherein the front assembly further comprises a leg-support portion extending upward from the knee platform.

Example 42 includes the subject matter of Example 41, wherein the leg-support portion is constructed to contact a front of the user's thighs when the user is kneeling on the knee platform.

Example 43 includes the subject matter of Example 42, wherein the leg-support portion is pivotably attached to the knee support and movable between (i) an upright position in which the leg-support portion extends generally perpendicular to the knee platform and (ii) a folded position in which the leg support portion extends rearwardly at least in part and defines an angle of less than 90° with the knee platform.

Example 44 includes the subject matter of any of Examples 23-29, wherein the knee platform includes sidewalls on opposite lateral sides of the knee platform and extending upward therefrom.

Example 45 includes the subject matter of any of Examples 23-29 and further comprises a knee pad on the knee platform.

Example 46 includes the subject matter of any of Examples 23-29, wherein the riser of the front assembly comprises a shock absorber.

Example 47 includes the subject matter of any of Examples 1-10 or 23-39 and further comprises a snow sports board, wherein the front assembly is attached to the forward portion and the rear assembly is attached to the rearward portion.

Example 48 includes the subject matter of Example 47, wherein the snow sports board is a snowboard or ski having a length of at least 130 cm.

Example 49 is a support and suspension assembly for use with a snow sports board, the assembly comprising a frame having a first portion extending downward and a second portion extending rearward from the first portion; a base configured to be attached to a snow sports board; a seat on the second portion of the frame; and a shock absorber connected between the base and the first portion of the frame; wherein the support assembly is configured to support a rider in a seated, face-forward position with knees of the rider vertically below and forward of hips of the rider.

Example 50 includes the subject matter of Example 48, wherein the frame generally defines an inverted L shape.

Example 51 includes the subject matter of any of Examples 49-50 and further comprises a first linkage connected between the first portion of the frame and a rear portion of the base; and a second linkage connected between the first portion of the frame and a front portion of the base.

Example 52 includes the subject matter of Example 49, wherein the first linkage and the second linkage extend upward and forward from the base to the first portion of the frame.

Example 53 includes the subject matter of Example 52, wherein the first linkage and/or the second linkage includes parallel rods connected together by a plate attached to and extending laterally between the parallel rods.

Example 54 includes the subject matter of any of Examples 51-52, wherein at least one of the first linkage and the second linkage connects to the base at two points and connects to the frame at two points.

Example 55 includes the subject matter of Example 49, wherein the second portion of the frame is at least 16 inches above the ground when the base is mounted to a snow sports board.

Example 56 includes the subject matter of Example 55, wherein the rearward end portion of the second portion of the frame is at least 16 inches above the ground when the base is mounted to a snow sports board, inclusive of up to 4 inches of sag due to a rider on the support assembly.

Example 57 includes the subject matter of any of Examples 49-56, wherein the seat is cantilevered above a rear portion of a snow sports board, thereby defining an open region below the second portion of the frame and rearward of the shock absorber.

Example 58 includes the subject matter of any of Examples 49-57, further comprising a knee support attached to the frame.

Example 59 includes the subject matter of Example 58, wherein the knee support comprises one or more knee plates attached to opposite sides of the frame and extending laterally from the frame.

Example 60 includes the subject matter of Example 59, wherein the knee support comprises pegs extending laterally from the frame.

Example 61 includes the subject matter of any of Examples 58-59, wherein a position of the knee support is fixed relative to the seat.

Example 62 includes the subject matter of Example 59, wherein a rear portion of each of the one or more knee plates has an adjustable height above the board.

Example 63 includes the subject matter of any of Examples 55-57, wherein the knee support is foldable along the first portion of the frame.

Example 64 includes the subject matter of any of Examples 58-63, wherein the knee support is spaced vertically from the second portion of the frame by a distance from 6 to 10 inches.

Example 65 includes the subject matter of any of Examples 49-64 further comprising a foot support configured to be attached to the snow sports board behind the base.

Example 66 includes the subject matter of any of Examples 49-64 further comprising a foot support attached to the rear base portion.

Example 67 includes the subject matter of any of Examples 65 or 66, wherein the foot support is configured to receive a rider's feet or ankles.

Example 68 includes the subject matter of any of Examples 49-67, wherein the seat is supported at least in part by the shock absorber.

Example 69 includes the subject matter of any of Examples 49-68, wherein the shock absorber is one of a pneumatic shock absorber or a hydraulic shock absorber. In other examples, the shock absorber is a coil-over shock absorber.

Example 70 includes the subject matter of any of Examples 49-69 further comprising a removable riser disposed between the seat and the shock absorber.

Example 71 includes the subject matter of any of Examples 49-70 further comprising a snow sports board secured to the base of the suspension assembly.

Example 72 includes the subject matter of any of Examples 49-71 further comprising one or more straps connected to the frame and configured to retain a rider to the suspension assembly.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

The invention claimed is:

1. A method of riding a snow sports board, comprising:
   providing a snow sports board having a suspension assembly mounted to the board and including leg supports on opposite sides of the suspension assembly, wherein the suspension assembly is configured to enable the rider to ride the board in a kneeling, face-forward position with the rider's lower legs on the leg supports such that during use knees of the rider are forward of and vertically lower than hips of the rider;
   initiating a turn in the kneeling, face-forward position by bracing body weight against a first one of the leg supports, thereby transferring weight to an edge of the snow sports board; and
   transferring centrifugal force to the board via the suspension assembly when coming out of the turn.

2. The method of claim 1, wherein the suspension assembly comprises:
   a base mounted to the snow sports board;
   a frame connected to and extending above the base, the frame including a first portion above the base and extending vertically upward or upward and forward to an upper end, the frame further including a second portion extending generally rearward from the upper end of the first portion;
   a seat on the second portion of the frame;
   a shock absorber connected between the base and the frame;
   a linkage assembly pivotably connected between the base and the first portion of the frame; and
   wherein the leg supports include a left leg support on a left side of the frame and a right leg support on a right side of the frame, wherein at least part of the left leg support and at least part of the right leg support are positioned rearward of the first portion of the frame.

3. The method of claim 2, wherein initiating the turn includes compressing the shock absorber.

4. The method of claim 2, comprising adjusting a height above the base of a rear portion one or both of the leg supports.

5. The method of claim 4, comprising positioning the left leg support and the right leg support to extend generally parallel to the base.

6. The method of claim 2, comprising positioning each of the leg supports to slope downward and rearward.

7. The method of claim 1, comprising pivoting a rear end of the second portion of the frame about an upper end of the shock absorber.

8. The method of claim 1, wherein initiating the turn is performed without the use of an outrigger.

9. The method of claim 1, wherein initiating the turn and transferring centrifugal force to the board are performed with the rider in a high kneeling, face-forward position.

10. The method of claim 1, wherein initiating the turn and transferring centrifugal force to the board are performed with the rider in a low kneeling, face-forward position.

11. The method of claim 1, wherein transferring centrifugal force to the board includes the rider bracing against at least one of the leg supports.

12. A method of boarding a chairlift with a snow sports board, the method comprising:
   providing a snow sports board having a suspension assembly mounted to the snow sports board, the suspension assembly comprising:
   a base mounted to the snow sports board;
   a frame connected to and extending above the base, the frame including a first portion above the base and extending vertically upward or upward and forward to an upper end, the frame further including a second portion extending generally rearward from the upper end of the first portion;
   a seat on the second portion of the frame;
   a shock absorber connected between the base and the frame; and
   leg supports on opposite sides of the frame;

wherein the suspension assembly is configured for the rider to ride the board in a kneeling face-forward position with the rider's lower legs on the leg supports such that knees of the rider are forward of and vertically lower than hips of the rider;

unweighting the shock absorber, thereby allowing the shock absorber to raise the second portion of the frame to a height of at least 16 inches above the snow sports board;

moving the snow sports board into a path of a chairlift; and receiving a seat of the chairlift in an open region beneath the second portion of the frame.

\* \* \* \* \*